US009661200B2

(12) United States Patent
O'Neill et al.

(10) Patent No.: US 9,661,200 B2
(45) Date of Patent: May 23, 2017

(54) AUXILIARY OPTICAL COMPONENTS FOR MOBILE DEVICES

(71) Applicant: olloclip, LLC, Huntington Beach, CA (US)

(72) Inventors: Patrick D. O'Neill, Huntington Beach, CA (US); Chong Pak, Lakewood, CA (US); Ryan Nguyen, Fountain Valley, CA (US); Jason Patrick, Long Beach, CA (US); Daniel Arato, Los Angeles, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/454,648

(22) Filed: Aug. 7, 2014

(65) Prior Publication Data

US 2015/0042877 A1    Feb. 12, 2015

Related U.S. Application Data

(60) Provisional application No. 61/863,361, filed on Aug. 7, 2013.

(51) Int. Cl.
*H04N 5/225* (2006.01)
*G03B 17/14* (2006.01)
*G03B 17/56* (2006.01)

(52) U.S. Cl.
CPC ........... *H04N 5/2254* (2013.01); *G03B 17/14* (2013.01); *G03B 17/565* (2013.01); *G03B 17/566* (2013.01)

(58) Field of Classification Search
CPC .... H04N 5/2254; G03B 17/14; G03B 17/565; G03B 17/566
See application file for complete search history.

(56) References Cited

U.S. PATENT DOCUMENTS

| 971,798 A | 10/1910 | Somdal |
| D48,816 S | 4/1916 | De Ville |

(Continued)

FOREIGN PATENT DOCUMENTS

| CN | 1694468 | 11/2005 |
| CN | 1797169 A | 7/2006 |

(Continued)

OTHER PUBLICATIONS

EU 002558874-0001, Oct. 16, 2014, Olloclip, LLC.

(Continued)

*Primary Examiner* — Lin Ye
*Assistant Examiner* — John H Morehead, III
(74) *Attorney, Agent, or Firm* — Knobbe, Martens, Olson & Bear, LLP

(57) ABSTRACT

In some embodiments, an auxiliary optical device for a mobile electronic device has a mounting component that is configured to be selectively attachable and detachable from the mobile electronic device. The mounting component is configured to be coupled to and decoupled from a mobile electronic device using an anchor that is inserted into a port of the mobile electronic device. In some embodiments, the auxiliary optical device attaches to the mobile electronic device by clamping or otherwise contracting or squeezing upon a portion of the mobile electronic device. In further embodiments, the auxiliary optical device is configured to be attached to wearable devices, such as eyewear that includes an onboard camera lens.

13 Claims, 22 Drawing Sheets

(56) References Cited

U.S. PATENT DOCUMENTS

| | | |
|---|---|---|
| D138,816 S | 9/1944 | Glasser |
| D141,692 S | 6/1945 | Nemeth |
| 2,428,719 A | 10/1947 | Nemeth |
| D148,816 S | 2/1948 | Pemstein |
| D181,908 S | 1/1958 | Hertzler |
| D183,253 S | 7/1958 | Gebele |
| 3,090,282 A | 5/1963 | Angenieux |
| 3,133,140 A | 5/1964 | Winchell |
| 3,138,060 A | 6/1964 | Eggert et al. |
| 3,454,323 A | 7/1969 | Dierks et al. |
| 3,620,149 A | 11/1971 | Ogihara |
| 3,680,461 A | 8/1972 | Amesbury et al. |
| 3,796,489 A | 3/1974 | Sone et al. |
| 3,817,601 A | 6/1974 | Colaiace et al. |
| 3,828,991 A | 8/1974 | Moore |
| D234,007 S | 12/1974 | Ritter |
| 3,961,349 A | 6/1976 | Forsyth et al. |
| D248,160 S | 6/1978 | Feinbloom et al. |
| 4,264,167 A | 4/1981 | Plummer |
| 4,305,386 A | 12/1981 | Tawara |
| D264,048 S | 4/1982 | Magner |
| D274,336 S | 6/1984 | Huckenbeck |
| D274,691 S | 7/1984 | Wallace |
| D275,766 S | 10/1984 | Suzuki |
| D295,871 S | 5/1988 | Charles |
| 4,760,510 A | 7/1988 | Lahti |
| 4,864,333 A | 9/1989 | Barber |
| 4,893,143 A | 1/1990 | Sheng-Huei |
| 5,050,963 A | 9/1991 | Murakami |
| 5,054,886 A | 10/1991 | Ozaki et al. |
| 5,311,358 A | 5/1994 | Pederson et al. |
| 5,416,544 A | 5/1995 | Stapleton |
| 5,455,711 A | 10/1995 | Palmer |
| 5,461,444 A | 10/1995 | Okura et al. |
| D374,878 S | 10/1996 | Palmer |
| D381,347 S | 7/1997 | Miyahara |
| D387,787 S | 12/1997 | Palmer |
| 5,781,351 A | 7/1998 | Murakami et al. |
| 5,831,778 A | 11/1998 | Chueh |
| 6,115,197 A | 9/2000 | Funahashi |
| 6,441,971 B2 | 8/2002 | Ning |
| 6,545,825 B2 | 4/2003 | Shoji et al. |
| 6,752,516 B1 | 6/2004 | Beadle |
| 6,889,006 B2 | 5/2005 | Kobayashi |
| 6,924,950 B2 | 8/2005 | Gventer et al. |
| 6,967,790 B2 | 11/2005 | Wei |
| 7,035,023 B2 | 4/2006 | Nanba et al. |
| D544,512 S | 6/2007 | Hunag |
| D546,863 S | 7/2007 | Ito et al. |
| D560,702 S | 1/2008 | Tokiwa et al. |
| D574,837 S | 8/2008 | Hooks, Jr. |
| 7,489,359 B2 | 2/2009 | Fukumoto |
| 7,600,932 B2 * | 10/2009 | Senba ............... G03B 17/14 |
| | | 359/827 |
| 7,604,423 B2 | 10/2009 | Nagata et al. |
| 7,636,518 B2 | 12/2009 | Tanaka et al. |
| 7,639,353 B2 | 12/2009 | Rooke |
| D617,360 S | 6/2010 | Endo et al. |
| 7,782,375 B2 | 8/2010 | Chambers et al. |
| D626,950 S | 11/2010 | Roman |
| 7,830,628 B2 | 11/2010 | Schaefer |
| 7,967,513 B2 | 6/2011 | Zhang |
| 8,000,589 B2 | 8/2011 | Chan |
| 8,040,621 B2 | 10/2011 | Chang et al. |
| D649,970 S | 12/2011 | Lyford et al. |
| D650,821 S | 12/2011 | Verhey |
| 8,073,324 B2 | 12/2011 | Tsai |
| 8,208,210 B2 | 6/2012 | An et al. |
| D669,587 S | 10/2012 | Mayer |
| 8,279,544 B1 | 10/2012 | O'Neill |
| D678,379 S | 3/2013 | O'Neill et al. |
| D686,265 S | 7/2013 | O'Neill et al. |
| 8,508,868 B2 | 8/2013 | Weber et al. |
| D692,472 S | 10/2013 | Samuels et al. |
| 8,573,810 B2 | 11/2013 | Mahaffey et al. |
| 8,593,745 B2 | 11/2013 | O'Neill |
| D695,295 S | 12/2013 | Chumanov et al. |
| D695,332 S | 12/2013 | O'Neill et al. |
| D697,957 S | 1/2014 | Glasse et al. |
| D697,958 S | 1/2014 | O'Neill et al. |
| 8,638,369 B2 | 1/2014 | Tsai |
| 8,639,106 B1 | 1/2014 | Gleason et al. |
| D699,275 S | 2/2014 | Samuels et al. |
| D700,228 S | 2/2014 | O'Neill et al. |
| 8,687,299 B1 * | 4/2014 | Sanford ............... F16B 21/04 |
| | | 359/827 |
| 8,760,569 B2 * | 6/2014 | Yang ............... G06F 1/1632 |
| | | 348/373 |
| D708,652 S | 7/2014 | Hyers |
| D708,653 S | 7/2014 | Hyers |
| 8,891,187 B2 | 11/2014 | O'Neill |
| D723,601 S | 3/2015 | O'Neill et al. |
| D726,796 S | 4/2015 | O'Neill et al. |
| D727,385 S | 4/2015 | O'Neill et al. |
| D727,868 S | 4/2015 | O'Neill et al. |
| 9,007,522 B1 | 4/2015 | O'Neill |
| D730,967 S | 6/2015 | O'Neill et al. |
| D730,968 S | 6/2015 | O'Neill et al. |
| D730,969 S | 6/2015 | O'Neill et al. |
| D740,878 S | 10/2015 | O'Neill et al. |
| 9,185,279 B2 | 11/2015 | Masuda et al. |
| 9,188,764 B2 | 11/2015 | O'Neill et al. |
| 9,195,023 B2 | 11/2015 | O'Neill et al. |
| 9,294,660 B2 | 3/2016 | O'Neill et al. |
| D754,228 S | 4/2016 | O'Neill et al. |
| 9,335,509 B2 | 5/2016 | O'Neill et al. |
| D761,896 S | 7/2016 | O'Neill et al. |
| 9,423,671 B2 | 8/2016 | O'Neill et al. |
| 9,454,066 B2 | 9/2016 | O'Neill et al. |
| 2004/0041911 A1 * | 3/2004 | Odagiri ............... G06F 1/1632 |
| | | 348/207.1 |
| 2004/0095500 A1 | 5/2004 | Sato et al. |
| 2004/0218081 A1 | 11/2004 | Lohr et al. |
| 2005/0088612 A1 | 4/2005 | Smith et al. |
| 2005/0099526 A1 | 5/2005 | Wu et al. |
| 2006/0014563 A1 | 1/2006 | Cheng |
| 2006/0233545 A1 * | 10/2006 | Senba ............... G03B 17/14 |
| | | 396/529 |
| 2007/0049340 A1 | 3/2007 | Wang et al. |
| 2007/0053682 A1 | 3/2007 | Chang |
| 2007/0122145 A1 | 5/2007 | Chang |
| 2007/0196090 A1 | 8/2007 | Kubo |
| 2007/0275763 A1 | 11/2007 | Sawadski et al. |
| 2007/0280677 A1 | 12/2007 | Drake et al. |
| 2008/0037011 A1 | 2/2008 | Rooke |
| 2008/0174891 A1 | 7/2008 | Kudoh |
| 2009/0109558 A1 | 4/2009 | Schaefer |
| 2009/0169198 A1 | 7/2009 | Chang |
| 2009/0181729 A1 * | 7/2009 | Griffin, Jr. ............ H04N 5/2254 |
| | | 455/575.1 |
| 2009/0316036 A1 | 12/2009 | Tom |
| 2010/0048243 A1 | 2/2010 | Fourquin et al. |
| 2010/0201943 A1 | 8/2010 | Pohjanen |
| 2010/0208369 A1 | 8/2010 | Shin |
| 2010/0309454 A1 * | 12/2010 | Zhang ............... G01J 3/02 |
| | | 356/39 |
| 2010/0328420 A1 | 12/2010 | Roman |
| 2011/0019294 A1 | 1/2011 | Strong |
| 2011/0043683 A1 | 2/2011 | Beach et al. |
| 2011/0110654 A1 | 5/2011 | Maki |
| 2012/0157160 A1 | 6/2012 | Ozcan et al. |
| 2012/0206565 A1 | 8/2012 | Villmer |
| 2012/0236425 A1 * | 9/2012 | O'Neill ............... G02B 7/14 |
| | | 359/827 |
| 2013/0028591 A1 | 1/2013 | Hicks |
| 2013/0094846 A1 | 4/2013 | Apter |
| 2013/0107109 A1 * | 5/2013 | Yang ............... G06F 1/1632 |
| | | 348/373 |
| 2013/0148954 A1 | 6/2013 | Uehara et al. |
| 2013/0206614 A1 | 8/2013 | O'Neill et al. |
| 2014/0028243 A1 * | 1/2014 | Rayner ............... G06F 1/163 |
| | | 320/103 |
| 2014/0078594 A1 | 3/2014 | Springer |

(56) References Cited

U.S. PATENT DOCUMENTS

| | | |
|---|---|---|
| 2014/0176690 A1 | 6/2014 | Hamel |
| 2014/0226268 A1 | 8/2014 | O'Neill et al. |
| 2014/0226300 A1 | 8/2014 | O'Neill et al. |
| 2014/0227026 A1 | 8/2014 | O'Neill et al. |
| 2014/0267882 A1 | 9/2014 | O'Neill et al. |
| 2014/0274208 A1 | 9/2014 | Baschnagel |
| 2014/0320987 A1 | 10/2014 | O'Neill et al. |
| 2015/0002950 A1 | 1/2015 | O'Neill et al. |
| 2015/0116851 A1 | 4/2015 | O'Neill et al. |
| 2015/0172522 A1 | 6/2015 | O'Neill et al. |
| 2015/0222315 A1 | 8/2015 | O'Neill et al. |
| 2015/0293430 A1 | 10/2015 | O'Neill et al. |
| 2015/0370150 A1 | 12/2015 | O'Neill et al. |
| 2016/0006934 A1 | 1/2016 | Eromaki et al. |
| 2016/0103292 A1 | 4/2016 | O'Neill |
| 2016/0154293 A1 | 6/2016 | O'Neill et al. |
| 2016/0248952 A1 | 8/2016 | O'Neill et al. |

FOREIGN PATENT DOCUMENTS

| | | |
|---|---|---|
| CN | 201173987 Y | 12/2008 |
| CN | 301914880 | 5/2012 |
| CN | 203069876 | 7/2013 |
| JP | 10-115858 | 5/1998 |
| JP | H11-119335 | 4/1999 |
| JP | 2000-311427 | 11/2000 |
| JP | 2002-027292 | 1/2002 |
| JP | 2003-295307 | 10/2003 |
| JP | 2004-191897 | 7/2004 |
| JP | 2006-251150 | 9/2006 |
| JP | 2007-079362 | 3/2007 |
| JP | 2007-206137 | 8/2007 |
| JP | 2007-219433 | 8/2007 |
| KR | 10-0842373 | 7/2008 |
| WO | WO 2006/002674 | 1/2006 |
| WO | WO 2012/082738 | 6/2012 |
| WO | WO 2012/128936 | 9/2012 |
| WO | WO 2013/081264 | 6/2013 |
| WO | WO 2014/043266 | 3/2014 |
| WO | WO 2015/048143 | 4/2015 |
| WO | WO 2015/119882 | 8/2015 |
| WO | WO 2015/157244 | 10/2015 |
| WO | WO 2015/195879 | 12/2015 |

OTHER PUBLICATIONS

EU 002586339-0002, Nov. 27, 2014, Olloclip, LLC.
Design U.S. Appl. No. 29/492,726 and prosecution history, filed Jun. 2, 2014, O'Neill et al.
Design U.S. Appl. No. 29/492,734 and prosecution history, filed Jun. 2, 2014, O'Neill et al.
Design U.S. Appl. No. 29/494,382 and prosecution history, filed Jun. 19, 2014, O'Neill et al.
Design U.S. Appl. No. 29/498,470 and prosecution history, filed Aug. 4, 2014, O'Neill et al.
"4 in One Samsung Lens—S3/S4/Note2/Note3," printed Nov. 9, 2014 in 7 pages, http://www.camera-licious.com/4-in-one-Samsung-Phone-Camera-Lens-Wide-Angle-Macro-Fisheye-Lens.
amazon.com, "Bosch PS91-1A 12-Volt Max Lithium-Ion Inspection Camera Kit with 36-inch and 48-inch Imager, (1) Battery and Case," printed Mar. 12, 2014 in 6 pages, http://www.amazon.com/Bosch-PS91-1A-Lithium-Ion-Inspection-36-Inch/dp/B004W7J2DI.
amazon.com, "Fish Eye lens + Wide Angle Lens + Macro Lens 3-in-1 Kit for iPod iPhone 4g," [Customer Reviews included] printed Feb. 3, 2012 in 10 pages.
amazon.com, "Universal Smart Phone Lens Kit . . . ," http://www.amazon.com/Universal-Camera-including-Telephoto-Microfiber/dp/B00AV3ZUOA/ref=sr_1_5?ie=UTF8&qid=1416511486&sr=8-5&keywords=universal+smart+phone+camera+lens+kit+including+one+12x+telephoto+manual+focus+lens, [Customer Review Dated Jan. 27, 2013] printed Nov. 9, 2014 in 7 pages.
ePHOTOzine, "Olloclip 3-in-One iPhone Photo Lens Review", http://www.ephotozine.com/article/olloclip-3-in-one-iphone-photo-lens-review-18816, Mar. 23, 2012 in 7 pages.
Focal, "Auxiliary Lens Set for Kodak Disc Camera", circa 1980s (photograph).
kickstarter.com, "Glif—iPhone 4 Tripod Mount & Stand", http://www.kickstarter.com/projects/danprovost/glif-iphone-4-tripod-mount-and-stand, Oct. 3, 2013 [Selected screenshots from video].
"Olloclip for Android?," printed Nov. 9, 2014 in 3 pages, http://forum.xda-developers.com/showthread.php?t=1721172s [Specifically Customer Comment Dated Jul. 22nd, 2013].
"Phoneboat" http://web.archive.org/web/20130415040755/http://www.phoneboat.com/buy.html as captured Apr. 15, 2013 in 1 page.
Photography Blog, "Olloclip Contest Winners", http://www.photographyblog.com/news/win_an_olloclip/, Apr. 30, 2013, pp. 2.
thinkbiologic.com, "Bike Mount for iPhone 4— Biologic Bicycle Accessories and Bike Gear," printed Mar. 12, 2014 in 2 pages, http://web.archive.org/web/20130117201439/http://www.thinkbiologic.com/products/bike-mount-iphone-4.
Strietelmeier, Julie, "Use Your 37mm DSLR Lenses with your Samsung Galaxy S4," Jun. 9, 2013, http://the-gadgeteer.com/2013/06/09/use-your-37mm-dslr-lenses-with-your-samsung-galaxy-s4/.
Uncrate, "Olloclip", http://web.archive.org/web/20130120204350/http://uncrate.com/stuff/olloclip/ as captured Jan. 20, 2013 in 2 pages.
youtube.com, "iPhone Colon Exam by Norm Augustinus," printed Mar. 12, 2014 in 1 page, www.youtube.com/watch?v=S3pE8h8R-cE.
U.S. Appl. No. 15/256,439, filed Sep. 2, 2016, O'Neill et al.

* cited by examiner

AUXILIARY OPTICAL COMPONENTS FOR MOBILE DEVICES

RELATED APPLICATION

This application claims the benefit of U.S. Provisional Patent Application No. 61/863,361, filed on Aug. 7, 2013, which is incorporated by reference herein in its entirety for all that it discloses.

BACKGROUND OF THE INVENTIONS

Field of the Inventions

This invention relates generally to accessories for mobile devices (e.g., mobile telephones, mobile texting devices, personal media players, tablet devices, laptop computers, desktop computers, gaming devices, and/or devices capable of linking electronically to another device or to a network such as the Internet, etc.), and specifically to removable optical components for mobile devices.

Description of the Related Art

In recent years, many advances in computer networking and processing technology have made it possible for mobile devices to comprise cameras that permit users to capture images. In many cases, these images can be stored, processed, and transmitted. However, there are many design constraints on onboard cameras in mobile devices that can limit the weight, size, expense, shape, adjustability, flexibility, versatility, feature choices, and overall quality of the lensing systems of such cameras. Consequently, many cameras and mobile devices are inadequate for a wide variety of photographic needs and may produce lower-quality photographic images, allow fewer image options, or provide incompatibilities in attachment structures, weight, optics, size, transportation, storage, ergonomics, and/or portability.

SUMMARY OF THE DISCLOSURE

Some aspects of the present disclosure relate to adapters and mounting components that can be used to facilitate the attachment of optical components to mobile devices, such as for use with onboard camera lenses of the mobile devices. In some embodiments, an adapter may include a camera lens for use with mobile devices that do not have integrated camera lenses. The adapter can facilitate the use of auxiliary optical components, such as auxiliary lenses and lens filters, with the camera lens.

Some aspects of the present disclosure relate to the use of anchors to secure mounting components or optical devices to mobile devices. In some embodiments, a mounting component may include an anchor that may be inserted into an input and/or output port of a mobile device. The anchor can facilitate or assist in proper alignment of an optical component, mounted to the mounting component, with an onboard camera lens of the mobile device by providing accurate and repeatable positioning of the mounting component with respect to the onboard camera lens of the mobile device. In some embodiments, the anchor may provide an electrical connection to the mobile device via the input and/or output port.

Some aspects of the present disclosure relate to clamping mechanisms for securing mounting components or optical devices to mobile devices. In some embodiments, an optical device may include a resilient structure that urges one portion of the optical device generally away from another portion of the device. A latching mechanism may resist the force of the resilient structure and thereby secure the optical device to the mobile device. In other embodiments, an optical device may include a resilient structure that urges one portion of the optical device generally toward another portion of the device. The two portions may then apply pressure to generally opposing faces of a mobile device to secure the optical device to the mobile device.

Some aspects of the present disclosure relate to structures and methods for securing mounting components or optical devices to wearable devices. In some embodiments, an optical device may be attached to "smart eyewear" such that an optical component is generally in removable optical alignment with an onboard camera lens of the smart eyewear.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

DETAILED DESCRIPTION OF EXAMPLES

Figure 1:
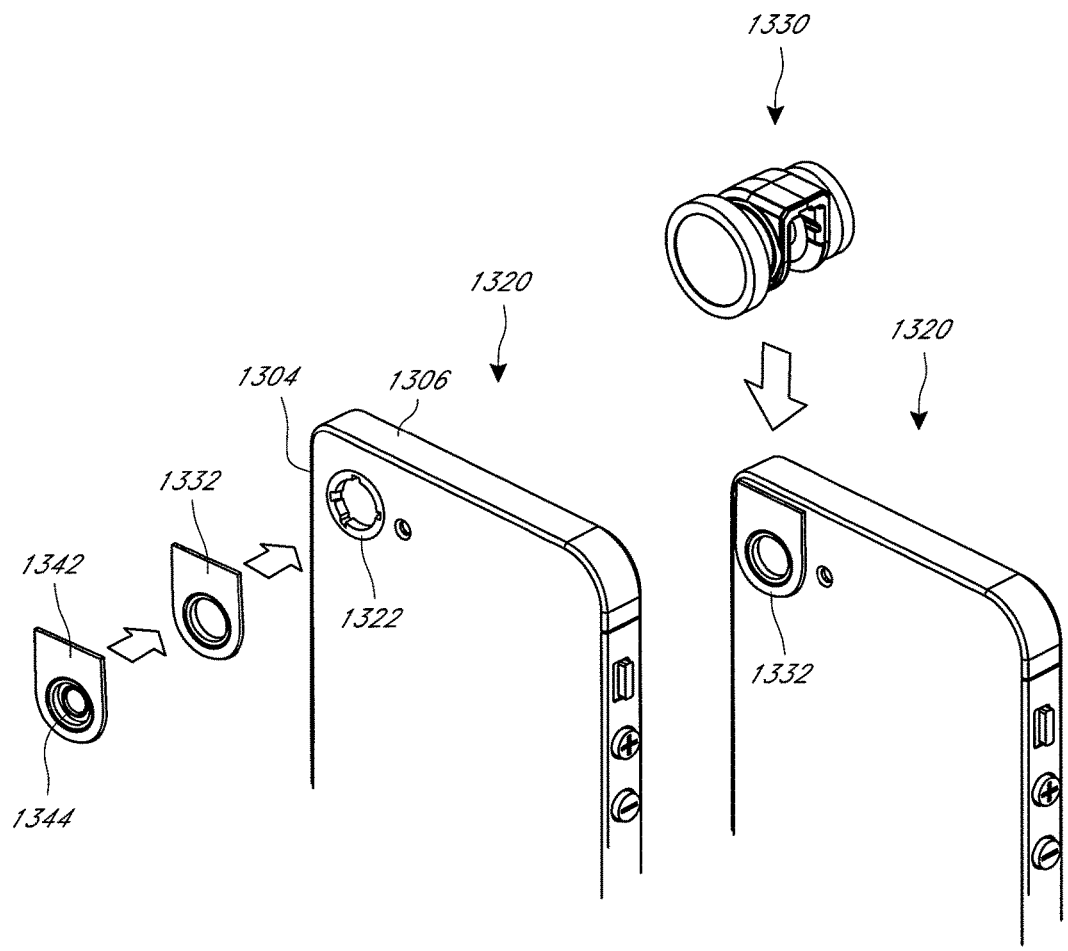
FIG. 1 illustrates adapters that may be used with mobile devices that have integrated lens receptacles or removable camera lenses.

The following detailed description is now directed to certain specific examples of embodiments of the disclosure.

In this description, reference is made to the drawings wherein like parts are designated with like numerals throughout the description and the drawings. The inventions are not limited to examples expressly illustrated or described in this specification. Various examples of mounting components, optical devices, and auxiliary lensing systems are illustrated in the drawings and/or described in the text of this specification. Any structure, material, function, method, or step illustrated or described in connection with any embodiment in the specification can be used instead of or in combination with any other structure, material, function, method, or step illustrated or described in connection with any other embodiment in the specification. Furthermore, no features, steps, structures, or methods disclosed in the specification are essential or indispensable.

The term "lens" in this specification is used in its ordinary sense, and includes powered lenses (e.g., lenses that focus, magnify, enlarge, or otherwise alter the direction of light passing through the lens), plano lenses (e.g., lenses that are generally planar, lenses that do not taper in thickness, and/or lenses that are not powered), simple lenses, compound lenses, generally spherical lenses, generally toroidal lenses, generally cylindrical lenses, etc. Any imaging device described or illustrated in this specification can include a retainer attached to one or more lenses or optical regions with one or more different features, including but not limited to a constant or variable magnifying lens, a wide-angle lens, a fisheye lens, a telescopic lens, a macro lens, a constant or variable polarizing lens, an anti-reflection lens, a contrast-enhancing lens, a light-attenuating lens, a colored lens, or any combination of the foregoing, etc.

The terms "mobile electronic devices" and "mobile devices" in this specification are used in their ordinary sense, and include mobile telephones, mobile texting devices, media players, electronic tablet devices, laptop computers, desktop computers, gaming devices, wearable electronic devices (e.g., "smart watches" or "smart eyewear"), and/or mobile electronic communication devices capable of linking electronically to another device or to a network such as the Internet, etc. Some mobile electronic devices include one or more onboard cameras that can be used for various imaging purposes, such as photography and video recording. In addition, some mobile electronic devices include one or more illumination components, such as one or more lights, and/or flashes, etc., that can be used for photography, videography, and/or other purposes (e.g., as a flash light).

Auxiliary optical systems comprising lens components or other optical components can be removably attached to mobile electronic devices to selectively enhance or otherwise change an image created from light that is transmitted through a lens to an onboard camera lens of the mobile electronic devices. For example, lens components such as those disclosed in U.S. Pat. No. 8,279,544, which is incorporated herein by reference in its entirety for all that it discloses, may be secured to a mobile electronic device by a clip that contacts generally opposing sides of the mobile electronic device. The lens component may include a different lens on each side of the clip portion (e.g., one side may have a fisheye lens, while the generally opposing side may have a wide angle, macro, telephoto, or some other photographic lens). When a user wishes to use a different lens, the user may rotate the lens component so that the lens from other side of the clip portion is positioned to alter light passing through to the onboard camera lens of the mobile electronic device.

The mobile electronic device 1320 illustrated in FIG. 1 is similar to an iPhone 5/5S, sold by Apple, Inc. of Cupertino, Calif. Any other mobile electronic device can be used. In this example, an onboard camera lens 132 is positioned near a first corner of the mobile device 1320 where first and second generally orthogonal sides 1304 and 1306 generally converge. The first and second sides 1304, 1306 can be located on generally opposing sides of the mobile electronic device 100 from a second corner or from third and fourth generally orthogonal sides, thereby positioning the input or output devices a substantial distance away from the third and fourth generally orthogonal sides or a convergence thereof.

As illustrated in FIG. 1, in some embodiments, a mobile device 1320 may be configured to accept removable lenses and/or cameras. For example, a lens receptacle 1322 may be positioned on, within, or beneath an essentially planar surface of the mobile device 1320. An onboard camera lens may be positioned partially or completely within or adjacent to the lens receptacle 1322, and the lens receptacle 1322 may be configured to allow installation and use of auxiliary components (e.g., telephoto lenses, wide angle lenses, lens filters, etc.) with the onboard camera lens. An adapter 1332 can be used to facilitate the attachment and use of a removably attachable optical device 1330, such as one or more of the removably attachable optical devices disclosed in U.S. Pat. No. 8,279,544. The adapter 1332 may comprise one or more connection features configured to connect with one or more corresponding connection features of a mobile electronic device (e.g., within the lens receptacle, on the surface of the device, or on a removable case attached to and made part of the device). For example, the adapter 1332 may be a multi-pronged adapter configured to be coupled, attached, or inserted into a multi-recessed receptacle 1322. In some embodiments, the adapter 1332 may be connected in a variety of different manners, such as snapping into the lens receptacle 1322, screwing or rotating into the lens receptacle 1322, and/or installing into the lens receptacle 1322 using a bayonet mount, etc. When installed, the adapter 1332 can provide one or more connection advantages, such as protecting the surface of the mobile device 1320, providing an essentially flat surface for attachment of a removably attachable optical device 1330, and/or providing a surface with enhanced gripping or tacky qualities to improve securement of the optical device 1330, etc.

In some embodiments, the receptacle 1322 of the mobile device 1320 may be a camera receptacle instead of, or in addition to, a lens receptacle. For example, a camera receptacle may be positioned on, within, or beneath an essentially planar surface of the mobile device 1320, and may be configured to allow installation and use of removable camera lenses and/or other optical components. Such functionality may be beneficial when the mobile device does not have an integrated or permanently attached onboard camera lens of its own or when the mobile device does not have an integrated or permanently attached onboard camera lens on both front and rear sides of the mobile device. An adapter 1342 may include an integrated camera lens or other optical component 1344, and the adapter 1342 may also be configured to facilitate the attachment and use of an auxiliary optical device 1330, as described above.

Figure 2:
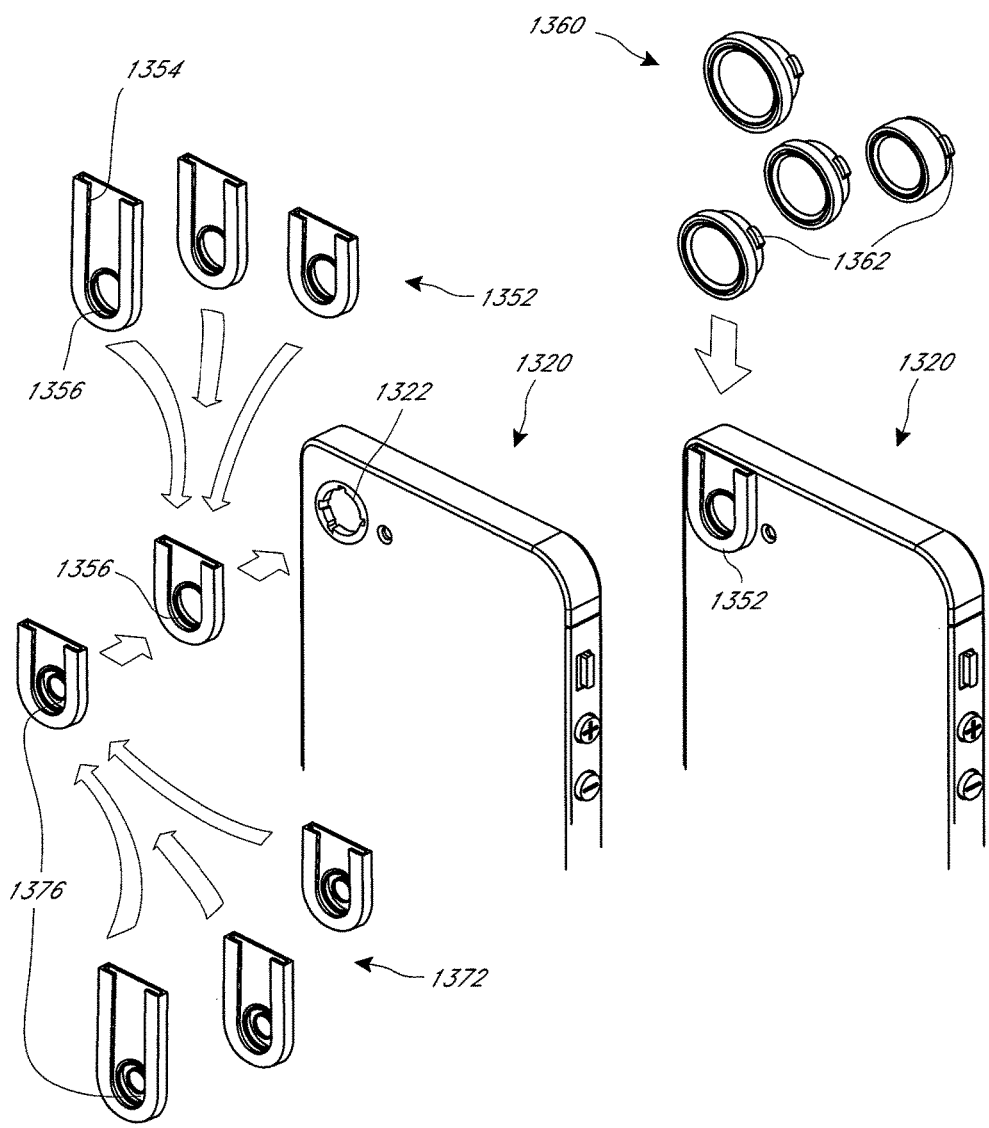
FIG. 2 illustrates removable mounting components that may be used with mobile devices that have integrated lens receptacles or removable camera lenses.

As illustrated in FIG. 2, in some embodiments an adapter or mounting component 1352 can be used with a mobile device, such as the mobile device 1320 described above, to facilitate the use of separate optical components 1360 (e.g., lenses, filters, etc.) with the mobile device 1320. For example, the mobile device 1320 described above may include a receptacle 1322 configured to accept removable cameras, lenses, and other optical components. A mounting component 1352 can be installed into (e.g., attached to, inserted into, snapped into, or otherwise coupled to) the receptacle 1322 to allow the use of separate optical components 1360 (e.g., lenses, filters, etc.). In some embodiments, as shown, the optical components 1360 may not be attachable to the receptacle 1322 or mobile device 1320 without the aid of a mounting component 1352 or some other adapter or component (e.g., the optical components 1360 may not have their own attachment clip or clamping structure, as the optical device 1330 shown in FIG. 1 does). The mounting component 1352 can be attached to the mobile device in any suitable manner, including by using one or more structures described or shown in this specification used to attach any other structure to a mobile electronic device.

The mounting component 1352 may provide an attachment structure 1354, such as a slot, track, or channel, to facilitate attachment of one of a collection of different optical components 1360. The optical components 1360 may include one or more complementary attachment structures 1362 configured to facilitate attachment of the optical components 1360 to the mounting component 1352. For example, an optical component 1360 may include one or more tabs or ridges that can be inserted into a corresponding slot, track, or channel of the mounting component 1352. The complementary attachment structures 1362 may be keyed to the attachment structure 1354 of the mounting component 1352 in order to ensure proper attachment of the optical component 1360. In some embodiments, an optical component 1360 may be attached to a mounting component 1352 by using an attachment motion, such as a rotating or sliding motion, to secure the optical component 1360 to the mounting component 1352. Such an attachment motion can be used to properly align the complementary attachment structure(s) 1362 with the attachment structure 1354 and complete the attachment process. When installed, the optical component 1360 can alter light that passes through an aperture 1356 of the adapter 1352 to an onboard camera of the mobile device 1320. A series of different optical components 1360 can be rapidly and easily removable, interchangeable, and/or replaceable by a user, without requiring the use of tools in some embodiments. A collection of different optical components can provide many different interchangeable or adjustable photographic options to a user, such as optical components configured to provide and/or to adjust optical features such as lenses for magnification, polarization, color tint, filtering, anti-reflection, contrast enhancement, wide-angle, and/or fish eye, etc. A collection of lenses with different optical features can be provided or used in connection with any component or system described in this specification.

A mounting component 1352 can permit one or more lenses of a collection to be used on a variety of different mobile devices. This may be particularly advantageous in situations where a user may acquire many different lenses with different optical features for use with a particular mobile device owned by the user, but then the user may later replace the mobile electronic device with another mobile electronic device of a newer or different model, or the user may use multiple mobile electronic devices in different settings, or the user may want to permit a friend to use one or more lenses of the user's lens collection with the friend's mobile electronic device of a newer or different model. To permit compatibility with changes of mobile devices, a plurality of different mounting components 1352 can be made available for removable attachment to the same collection of lenses. Each of the various mounting components 1352 can correspond with and be attachable to one or more different types, configurations, or models of mobile electronic devices, depending upon the specific dimensions, camera locations, protective case options, and other features that differentiate various mobile devices. By providing various mounting components 1352 tailored for different types, configurations, or models of mobile electronic devices, users can merely replace the mounting component 1352 when a different mobile electronic device is used without requiring replacement of the collection of optical components 1360.

In some embodiments, as described above, the mobile device 1320 may include a camera receptacle instead of, or in addition to, a lens receptacle. For example, a camera receptacle may be positioned on an essentially planar surface of the mobile device 1320, and may be configured to allow installation and use of removable cameras, lenses, and/or other optical components. Similar to the adapter described above with respect to FIG. 1, an adapter or mounting component 1372 may include an integrated camera, lens, or other optical component 1376, and the mounting component 1372 may also be configured to facilitate the attachment and use of various auxiliary optical components 1360. In addition, the mounting components 1372 with integrated camera lenses or other optical components may be provided in various configurations tailored for different types, configurations, or models of mobile electronic devices as described above with respect to the mounting components 1352. Any and all structures, steps, methods, or components described in this specification for a lens can also or alternatively be used for a camera (e.g., either an onboard camera embedded in a mobile electronic device or a camera positioned on or in any of the clips or other attachment structures described and illustrated in this specification to facilitate connection with a mobile electronic device).

Figure 3:
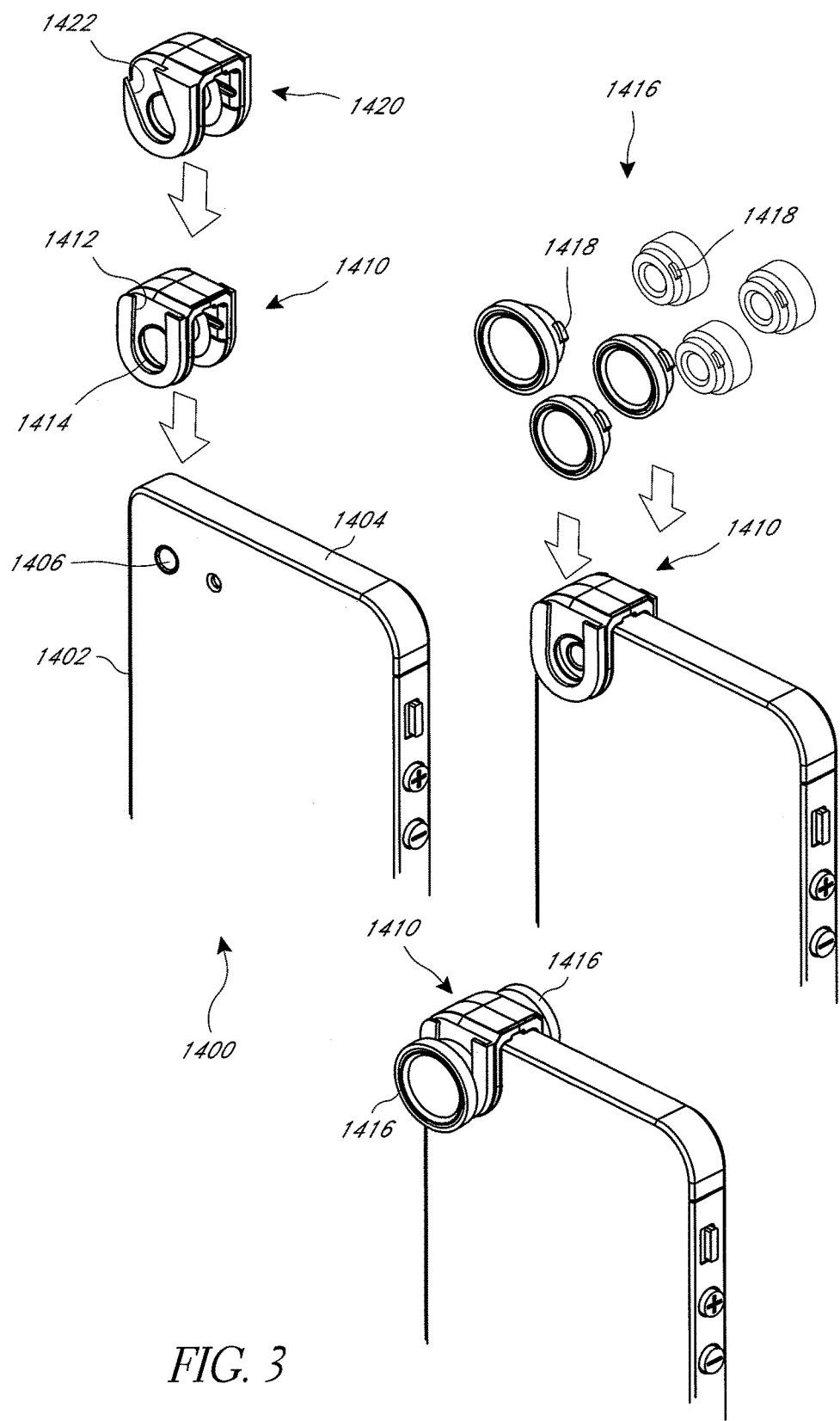
FIG. 3 illustrates a removable mount to which one or more optical components may be attached.

FIG. 3 illustrates a removably attachable mounting component 1410 that may be attached to a mobile device 1400 to facilitate the use of various auxiliary optical components 1416 that may include any of the features described herein. In some embodiments, as shown, the mobile device 1400 may include an onboard camera lens 1406 located on a generally planar surface and generally near the intersection of two generally perpendicular edges 1402, 1404 of the mobile electronic device 1400. The onboard camera lens 1406 may be substantially flush with, or positioned beneath, the generally planar surface. For example, the mobile device 1400 may be an iPhone 5/5S, manufactured by Apple. A mounting component 1410 may be attached to the mobile device 1400 such that an aperture 1414 of the mounting component is generally aligned with the onboard camera lens 1406. When an optical component 1416 is attached to the mounting component, the optical component 1416 may be automatically positioned such that the optical axis of the optical component 1416 is aligned with the aperture 1414 and onboard camera lens 1406, without requiring additional manual alignment or adjustment by a user.

The mounting component 1410 may include two generally parallel sides configured to form a channel between the two generally parallel sides. When the mounting component 1410 is attached to the mobile device 1400, a portion of the mobile device 1400 (e.g., a corner) may be inserted into the channel, and the two generally parallel sides of the mounting component 1410 may contact two generally parallel, generally planar surfaces of the mobile device 1400 (e.g., the "front" and "back" faces of the mobile device). One or both of the generally parallel sides of the mounting component 1410 may exert a gripping force on the mobile device 1400, or may include an area of increased friction, such as a tacky layer, to aid in securement of the mounting component 1410 to the mobile device 1400. In some embodiments, the mounting component 1410 may be configured to attach to the mobile device 1400 using any of the mechanisms or techniques described above, described in U.S. Pat. No. 8,279,544, or known to those of skill in the art.

The mounting component 1410 may include an attachment structure 1412, such as a slot, track, or channel, to facilitate attachment of an optical component 1416. An optical component 1416 may have one or more complementary attachment structures 1418 such as tabs or ridges that can, e.g., be inserted into the attachment structure 1412 of the mounting component 1410. The complementary attachment structures 1418 may be keyed to the attachment structure 1412 of the mounting component 1410 in order to ensure proper attachment of the optical component 1416. When installed, an optical component 1416 can alter light that passes through an aperture 1414 of the mounting component 1410 to an onboard camera of the mobile device 1400.

In some embodiments, an optical component 1416 may be attached to a mounting component 1410 by using an attachment motion, such as a rotating or sliding motion, to secure the optical component to the mounting component 1410. Such an attachment motion can be used to properly align the complementary attachment structure(s) 1418 with the attachment structure 1412 and complete the attachment process. In some embodiments, as shown, the mounting component 1410 may include multiple attachment structures 1412, such as one on each generally parallel side of the mounting component 1410, to allow attachment of multiple optical components 1416 (e.g., an optical component 1416 generally adjacent to each of a front and back face of the mobile device 1400). In some embodiments, as illustrated, the attachment motion can involve advancing the lens toward the mounting component and/or connecting the lens and the mounting component in a generally vertically downward path. In some embodiments, as illustrated, the attachment motion can involve advancing the lens toward the mounting component and/or connecting the lens and the mounting component in a generally diagonally downward path. Many different attachment motions and structures can be utilized. As illustrated, at least two different lenses can be attached to the same mounting component at the same time. Each lens can have different optical features.

In some embodiments, a mounting component 1410 may include a mounting structure 1412 in a generally orthogonal orientation with respect to an edge 1404 of the mobile device 1400 near the onboard camera lens 1406. Attachment of an optical component 1416 can therefore be performed from an area generally near the edge 1404 using a motion generally orthogonal to the edge 1404. In additional embodiments, a mounting component 1420 may include a mounting structure 1422 in a generally diagonal orientation with respect to one or more edges 1402 or 1404 of the mobile device 1400 (or the convergence thereof) near the onboard camera lens 1406. Attachment of an optical component 1416 can therefore be performed using a motion generally diagonal with respect one or more edges 1402, 1404 of the mobile device 1400.

Figure 4:
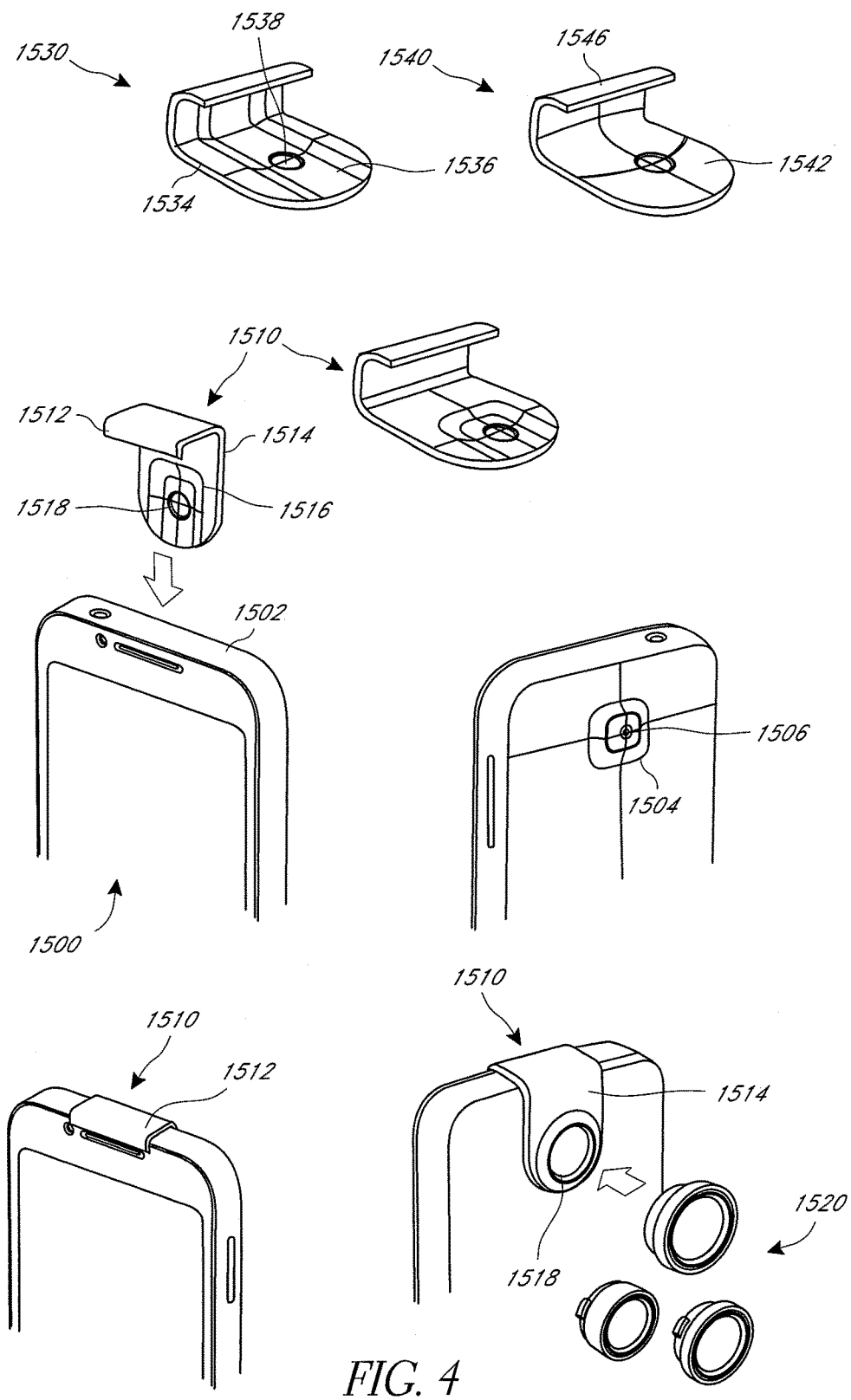
FIG. 4 illustrates a removable mount, for use with mobile devices that have an onboard camera, to which one or more optical components may be attached.

FIG. 4 illustrates embodiments of optical component mounts for use with various mobile devices. In some embodiments, as shown, the mounting components are not required to be positioned on or near a corner of the mobile device 1500, but instead may be positioned at various locations on an edge or other surface of the mobile device 1500. Such mounting components may therefore be used with mobile devices that include onboard cameras that are not located near a corner. For example, a mounting component 1510 may be configured for use with a mobile device 1500 that includes an onboard camera lens 1506 that is centrally located, such as at or near a generally vertical line that generally bisects the mobile device from top to bottom. For example, in some embodiments, the onboard camera lens 1506 may not be substantially closer to one corner of the device 1500 than a second corner of the device 1500 sharing a common edge 1502, as with the Samsung Galaxy S5, manufactured by Samsung.

The mounting component 1510 may be configured to removably attach to a mobile device 1500 and facilitate the use of separate optical components 1520 with an onboard camera 1506 of the mobile device 1500. The mounting component 1510 may include a first side 1514 coupled to a securement portion 1512. The first side 1514 may include a stabilizing portion 1516 that aids in stabilizing the mounting component 1510 in a particular position with respect to the mobile device 1500. For example, as shown, the first side 1514 may include a groove or channel that is shaped and/or sized to correspond to a surface feature, such as a protruding region 1504, on the mobile device 1500. A generally planar face of the mobile device 1500 may include a region 1504 that is curved or recessed or that protrudes from the generally planar face. The region 1504 may include or surround an onboard camera lens 1506. The stabilizing portion 1516 (e.g., the groove or channel) of the first side 1514 of the mounting component 1510 can be complementary in shape to the protruding region 1504, thereby allowing the first side 1514 to be positioned substantially flush with the generally planar face of the mobile device 1500. In addition, the stabilizing portion 1516 of the first side 1514 can inhibit or prevent sliding or lateral movement of the mounting component 1510 with respect to the generally planar face of the mobile device 1500.

The securement portion 1512 of the mounting component 1510 can contact an edge 1502 of the mobile device 1500, aiding in placement and/or securement of the mounting component 1510 to the mobile device 1500. In some embodiments, the securement portion 1512 of the mounting component 1510 may partially or completely wrap around an edge of the mobile device 1500 to contact a second generally planar surface or face of the mobile device 1500. The securement portion may be configured to contact a plurality of different surfaces of the mobile device at the same time. As a result, the securement portion 1512 and first side 1514 of the mounting component 1510 may form a channel. For example, the first side 1514 and a part of the securement portion 1512 that partially or completely wraps around an edge of the mobile device 1500 may form first and second generally parallel walls of the channel, respectively.

The mounting component 1510 may be attached to the mobile device 1500 such that a portion of the mobile device 1500 is inserted into the channel (e.g., a portion of an edge 1502 of the mobile device 1500). The width of the channel (e.g., the distance between the first and second walls of the channel) may be generally complementary to the thickness of the mobile device 1500 (e.g., the distance between the first and second generally planar, generally parallel sides, or the front and back "faces"). In some embodiments, the width of the channel may be slightly less than the thickness of the mobile device 1500. In some cases, one or both of walls of the channel may be temporarily deflected or forced outward during attachment in order to install the mounting component 1510 on the mobile device 1500. One or both of the walls of the channel may be biased inward (e.g., toward the other wall) so as to exert a gripping force on the mobile device 1500. In some embodiments, some portion of the first and/or second walls may be rubbery, tacky or otherwise configured with a coefficient of friction sufficient to secure the mounting component 1510 to the mobile device 1500.

An optical component 1520 may be permanently or semi-permanently coupled to the mounting component 1510. For example, lenses (such as lens filters or magnifiers), auxiliary cameras, and the like may be mounted to the mounting component 1510. The optical components can alter light as it passes through the optical component to the mobile device 1500.

In some embodiments, a plurality of different optical components 1520 can be removably mounted to the mounting component 1510 for use with the mobile device 1500. For example, the mounting component 1510 may include an optical component receptacle 1518 (e.g., on the first side 1514). The optical component receptacle 1518 may define an aperture through which light may pass through the mounting component 1510 to an onboard camera 1506 of the mobile device 1500. The optical component receptacle 1518 may be threaded, configured as a bayonet mount, etc. Optical components 1520 may be mounted to the mounting clip 1510 by attaching them to the optical component receptacle 1518. The interface or attachment mechanism between the optical component and optical component receptacle can have many different forms, including any of those described and/or illustrated in this specification for attaching any components.

In some embodiments, as shown, the first side of the mounting component may include a stabilizing portion configured with shapes or features other than those described above. For example, a mounting component 1530 may include a first side 1534 with a groove 1536 configured to fit the shape of the onboard camera or nearby region of the mobile device 1500. As another example, a mounting clip 1540 may include a first side 1542 shaped so as to substantially match or complement the curvature of a face of a mobile device, such as a face that includes an onboard camera. The example shapes and features shown and described are illustrative only, and are not intended to be limiting.

Figure 5:
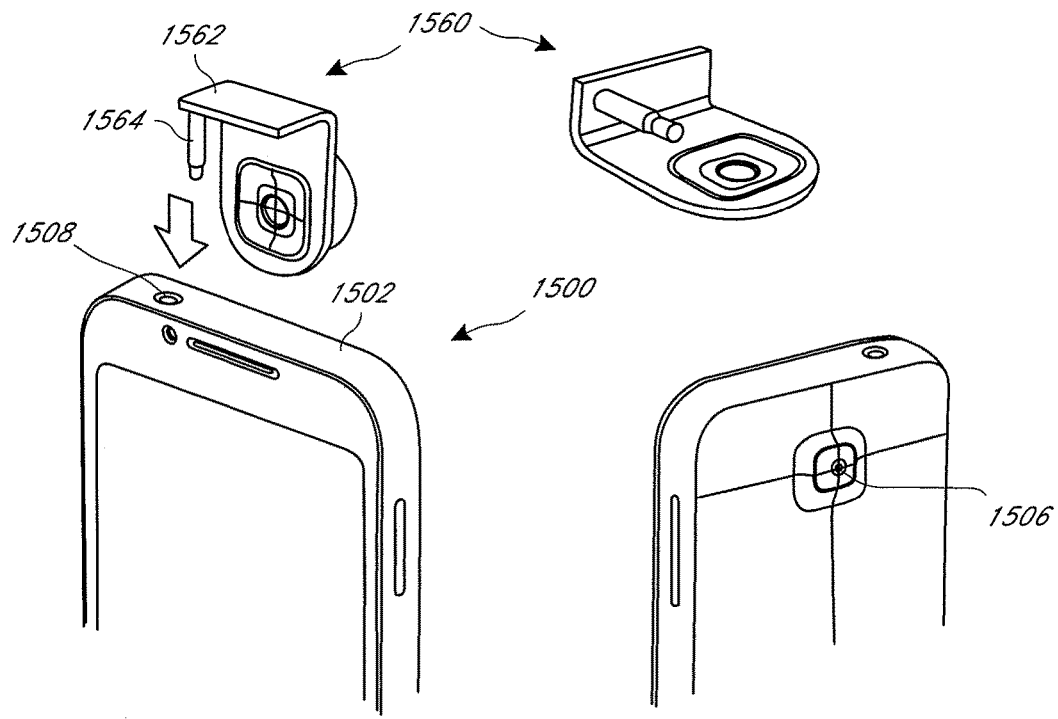
FIG. 5 illustrates an embodiment of a removable mount configured to make use of a mobile device's input and/or output port for securement.
Figure 5:
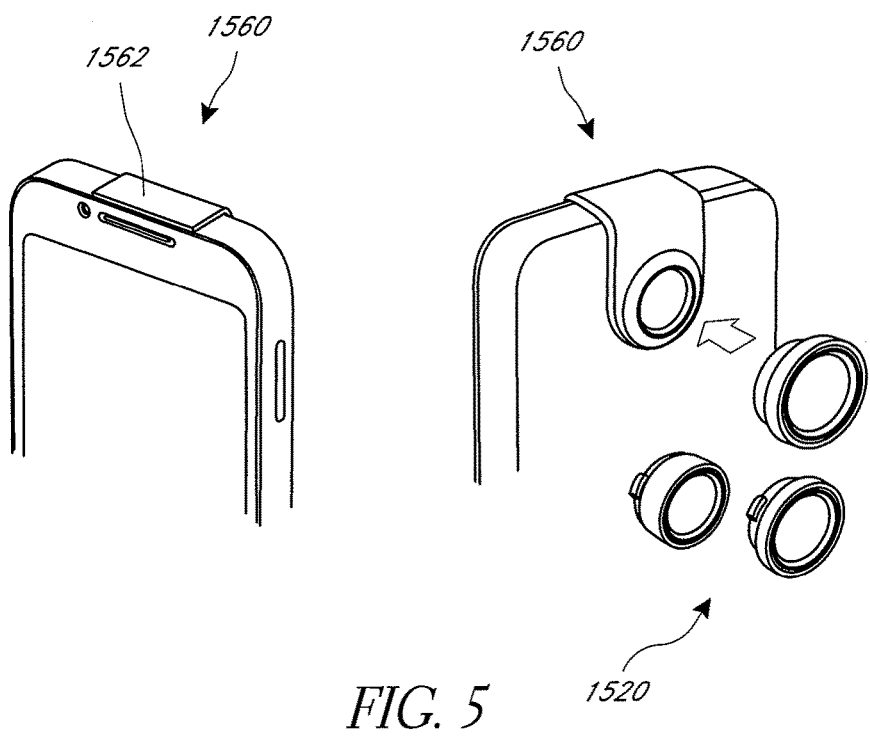

FIG. 5 shows additional embodiments of mounting components, some of which include an anchoring component for aiding in placement or securement of the mounting components to mobile devices. For example, mounting component 1560 includes an post, rod, dowel, or other anchor 1564 that is configured to be inserted into a pre-existing port 1508 of the mobile device 1500 that is intended for some other functional purpose, such as an electronic port (e.g., a headphone jack, microphone jack, USB port, network cable jack, power cable jack, memory card slot, or any other hole, slot, or input and/or output port of the device). The anchor 1564 may be inserted into, attached to, or protrude from, a securement portion 1562 or some other portion of the mounting component 1560. When the mounting component 1560 is attached to the mobile device 1500, the anchor 1564 may be inserted into the headphone jack 1508 of the mobile device, thereby securing the mounting component 1560 to the mobile device 1500 (e.g., inhibiting or preventing accidental removal). Use of the anchor 1564 in this manner may also aid in positioning the mounting component 1560 with respect to the mobile device 1500 such that optical components 1520 may be used with an onboard camera lens 1506 of the mobile device 1500. In addition, use of the anchor 1564 in this manor may aid in stabilizing the mounting component 1560 in a certain position with respect to the mobile device 1500 (e.g., resist sliding or lateral movement of the mounting component 1560 with respect to the mobile device 1500). A stabilizing portion, such as those described above, may also be included, e.g., on a first side of the mounting component 1560, to further aid in securing, positioning, and/or stabilizing the mounting component 1560. In some embodiments, as illustrated, the use of an anchoring component may permit the mounting component 1560 to contact less than three different sides of the mobile device (e.g., only two sides). For example, the mounting component may contact only the face of the mobile electronic device 1500 in which the onboard camera 1506 is embedded plus one other side of the mobile electronic device, such as a top edge 1502 of the mobile electronic device, while entirely or nearly entirely avoiding contact with the opposing face of the mobile electronic device that includes the screen or other components, in a manner that would otherwise block a portion of a screen or interfere with normal usage of the mobile device.

Figure 6:
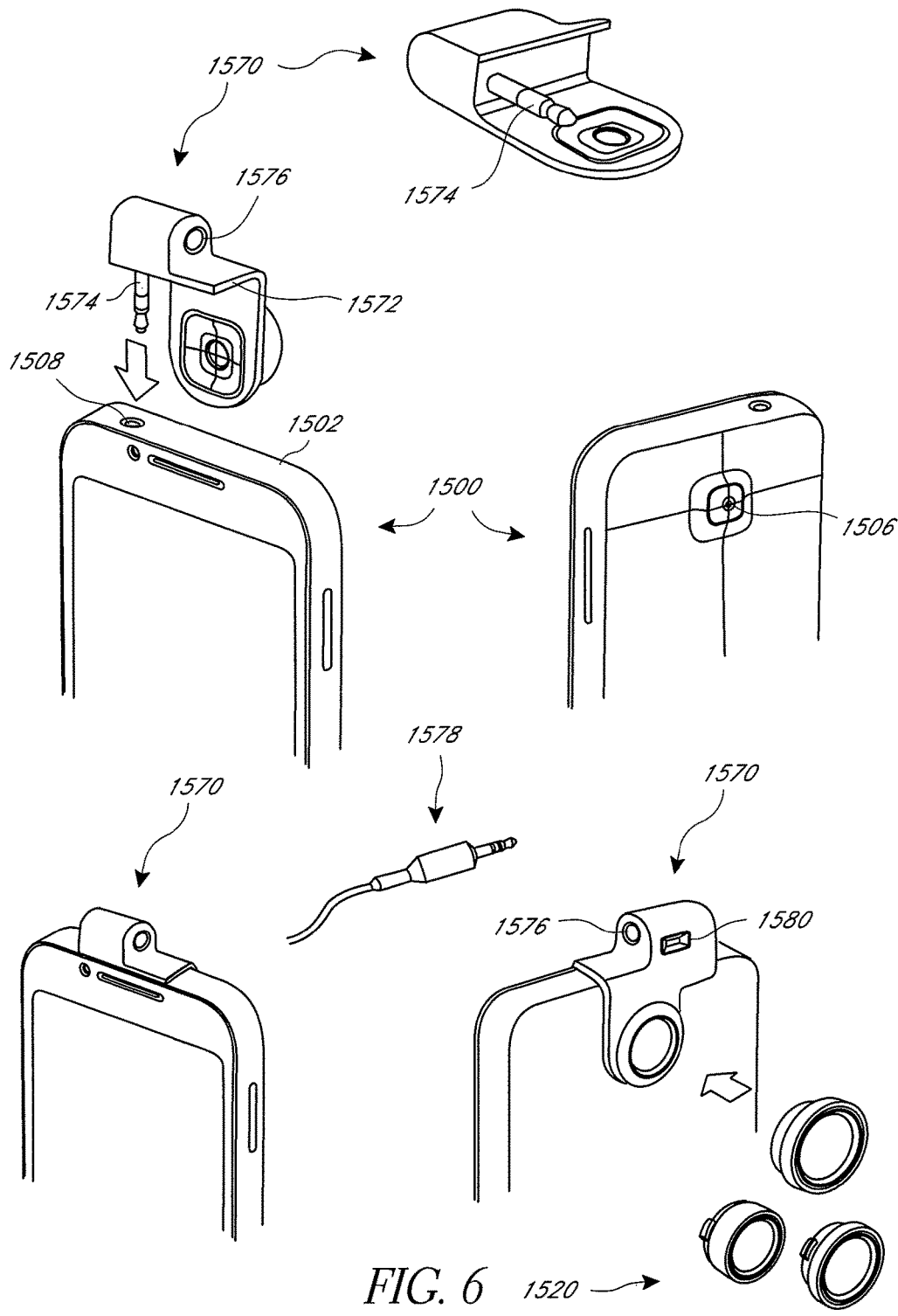
FIG. 6 illustrates another embodiment of a removable mount configured to make use of a mobile device's input and/or output port for securement.

FIG. 6 shows additional embodiments of mounting components. As shown, a mounting component 1570 may include an anchor 1574 that can facilitate electronic communication with the mobile device 1500. For example, the anchor 1574 may be used to establish an electrical connection with the mobile device 1500 via a headphone jack or some other input and/or output port of the mobile device 1500. The mounting component 1570 may include a port 1576, such as an input and/or output port that is configured to enable a pass-through electrical or optical connection to the anchoring port on the mobile device. In some embodiments, electrical circuitry or wiring in the mounting component 1570 may facilitate communication between the anchor 1574 and the port 1576, and therefore between the mobile device 1500 and some other component or accessory. For example, a separate accessory (e.g., ear phones, a flash, a speaker, etc.) may be coupled to the mounting component 1570 via an auxiliary cable 1578. In this way, in some embodiments, the use of the mobile device port as an anchoring location does not prevent or interfere with the use or the originally intended functionality of the port on the mobile electronic device.

In some embodiments, as shown, a mounting component 1570 may include one or more electronically actuated or enabled features that include an electronic connection with the mobile electronic device through an electronic port on the mobile electronic device, which may or may not also be a mechanical anchoring location for the mounting location. For example, an electronic connection between the mounting component may actuate and/or provide power to an indicator (e.g., an LED light, a moving flag arm), a focusing or zooming mechanism, a polarizing adjuster, a remote controller, a tethered or remove photographic trigger, and/or an illuminating component 1580 (e.g., an external flash powered by a flash bulb or LED). The external flash 1580 can be triggered via a connection point or an anchor 1574 of the mounting component 1570 inserted into a port of the mobile device 1500. For example, the mobile device may be configured to activate the flash 1580 by sending an electrical communication through an output port. The external flash 1580 may draw electrical power from a mobile phone port to which the mounting component is anchored, or the mounting component 1572 may include a battery. In some embodiments, the external flash 1580 may be triggered through other means, such as wireless communication (e.g., Bluetooth® transmission). In some cases, the anchor 1574 may or may not provide electrical communication with the mobile device 1500. In some embodiments, the mounting component may not include a separate external flash or may not include an external flash at all, but rather may be configured to convey light from a flash of the mobile device 1500 to an area generally in the field of view of an optical component 1520 attached to the mounting component 1572. For example, the mounting component 1572 may include a light-conveying structure, such as an optical fiber, a light pipe, a transparent or translucent window, etc.

FIGS. 7, 8A, 8B, 9A, 9B, 10A, 10B, 11A and 11B ("FIGS. 7-11") show embodiments of mounting components to which multiple optical components may be mounted on a same side of a device at the same time. For example, two or more optical components may be coupled to a single mounting component permanently, or for a user-selectable period of time. The presence of two or more optical components can provide a user with a choice of optical components for any particular photo or video, while also reducing or eliminating the need to manually remove and replace a currently attached optical component with a desired optical component. Optical components may be permanently coupled or attached to the mounting component, or the mounting component may allow for the removal and re-attachment of various removable optical components, as described above.

Figure 7:
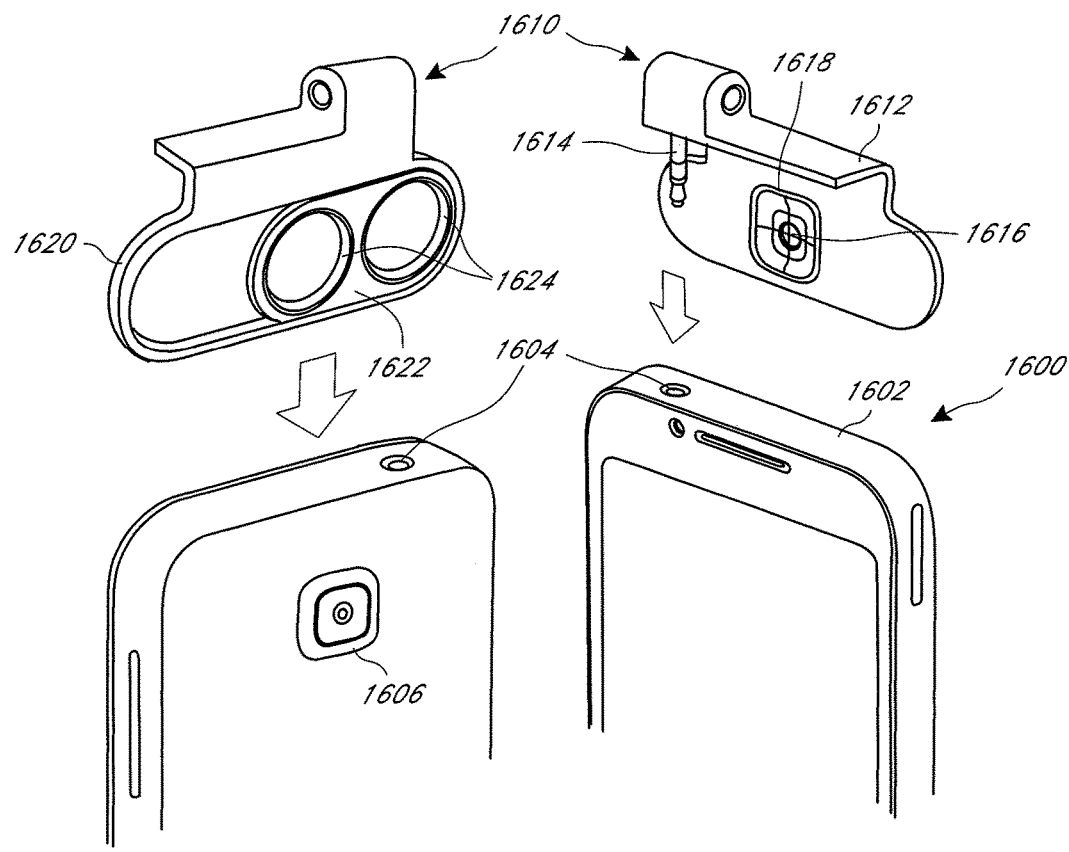
FIG. 7 illustrates an embodiment of a removable mount that permits attachment and selective use of multiple optical components.
Figure 7:
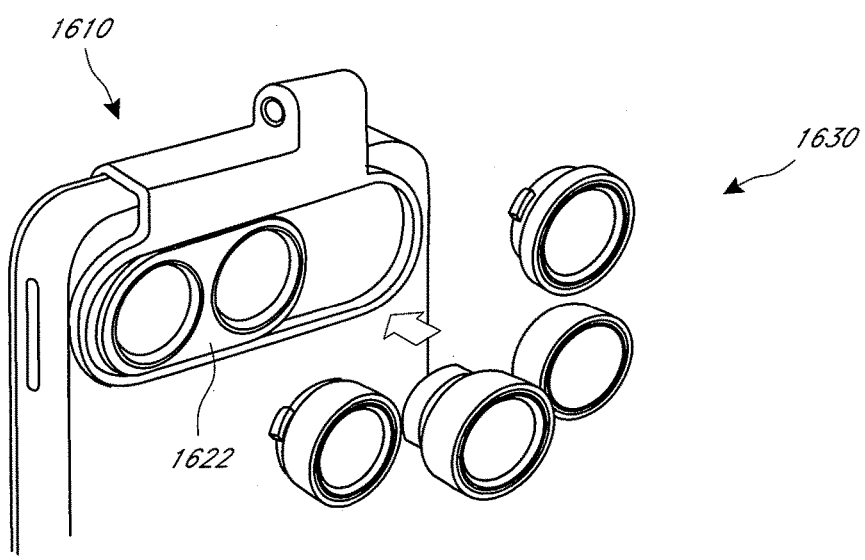

FIG. 7 shows an embodiment of a mounting component 1610 with a sliding multi-component member 1622 to which multiple optical components 1630 may be mounted. The sliding multi-component member 1622 may include two or more optical component receptacles 1624 (or permanently/semi-permanently attached optical components). The mounting component 1610 may include a first side 1620 and a securement portion 1612. The first side 1620 may include a slide-guiding member for the sliding multi-component member 1622, such as a housing, a track, a groove, and/or a channel in which the sliding multi-component member 1622 may be seated. The sliding multi-component member 1622 can slide or otherwise move within the mounting component 1610 housing between two or more positions. A first position may place a first optical component 1630 adjacent an onboard camera lens 1606 of the mobile device 1600 for use with the onboard camera lens 1606. When the sliding multi-component member 1622 is moved to a second position within the housing, a second optical component may be positioned adjacent the onboard camera lens 1606. In some embodiments, a gasket 1618 may be coupled, co-molded, or otherwise attached to a surface of the mounting component 1610 facing the mobile device 1600 to provide a light-tight seal with the onboard camera lens 1606.

In some embodiments, the width, length, and/or one or more other dimensions of the sliding member 1622 and/or the slide-guiding member can be configured to permit a first one of a plurality of conjoined or attached optical components 1630 to be generally positioned over or generally aligned with an onboard camera of a mobile electronic device while at the same time a second of the conjoined or attached optical components 1630 is positioned at or in abutment with an end of a channel or groove or otherwise positioned at an engagement or other stopping location, permitting the position of the second optical component 1630 in such location to effectively position properly the first optical component 1630 with respect to the camera. As illustrated, a continuous channel or groove with endpoints configured to be positioned on both sides of the onboard camera can permit selective positioning of a plurality of different optical components 1630 generally in front of or generally in alignment with the onboard camera 1606 by sliding the sliding member 1622 back and forth between stopping locations on generally opposite sides from the onboard camera 1606.

In some embodiments, the mounting component 1610 (or any other mounting component or clip of the present disclosure) may include an anchor 1614 and/or an electrical connection which may be inserted into a port 1604 of the mobile device 1600. As described above, the anchor 1614 can secure, position, and/or stabilize the mounting component 1610 with respect to the mobile device 1600. In some embodiments, the anchor 1614 may facilitate electrical communication with the mobile device 1600. The anchor 1614 and/or electrical connection can include any or all features described elsewhere in this specification for other anchors and/or electrical connections.

Figure 8A:
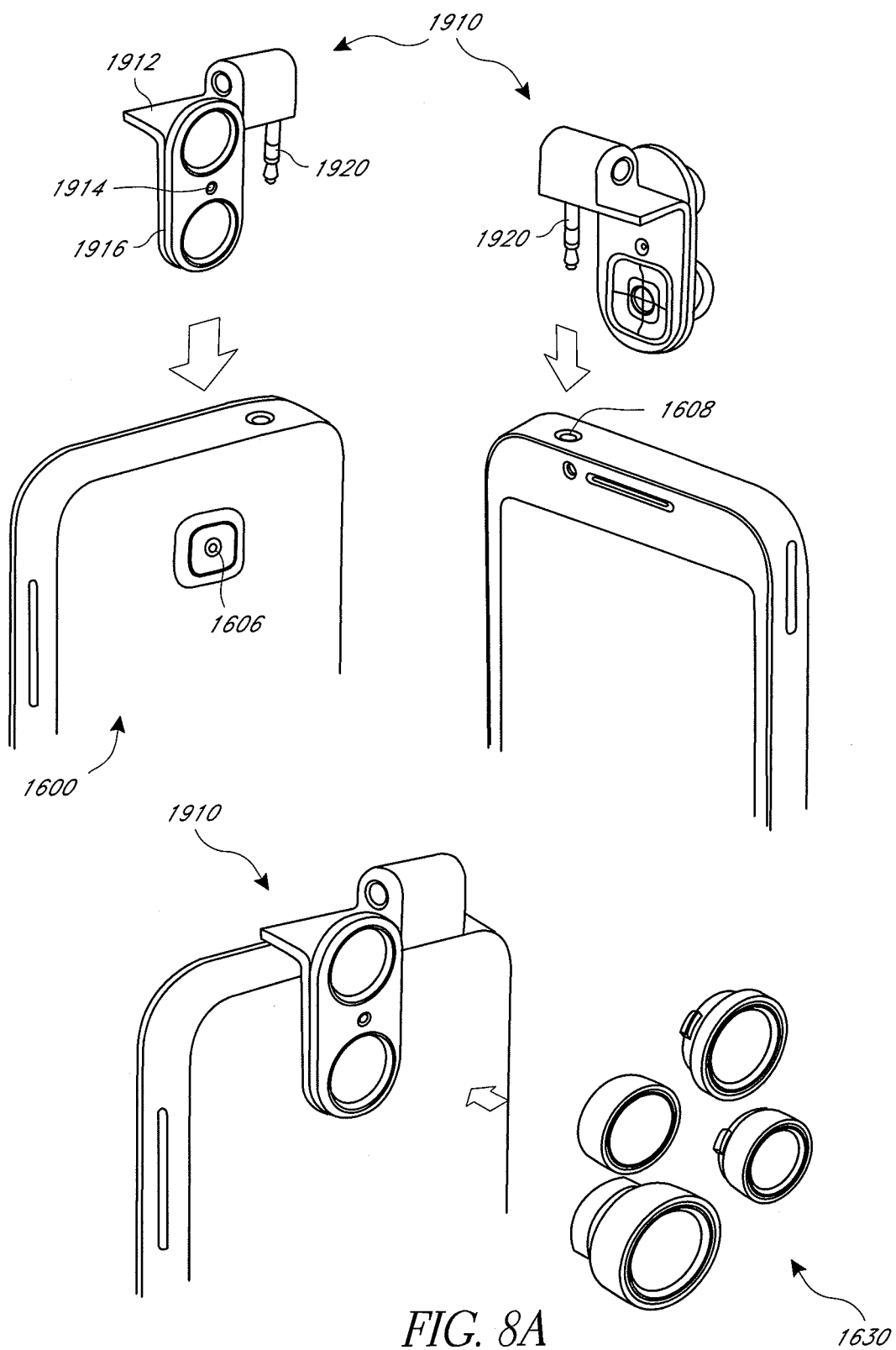
FIGS. 8A-8B illustrate another embodiment of a removable mount that permits attachment and selective use of multiple optical components.
Figure 8B:
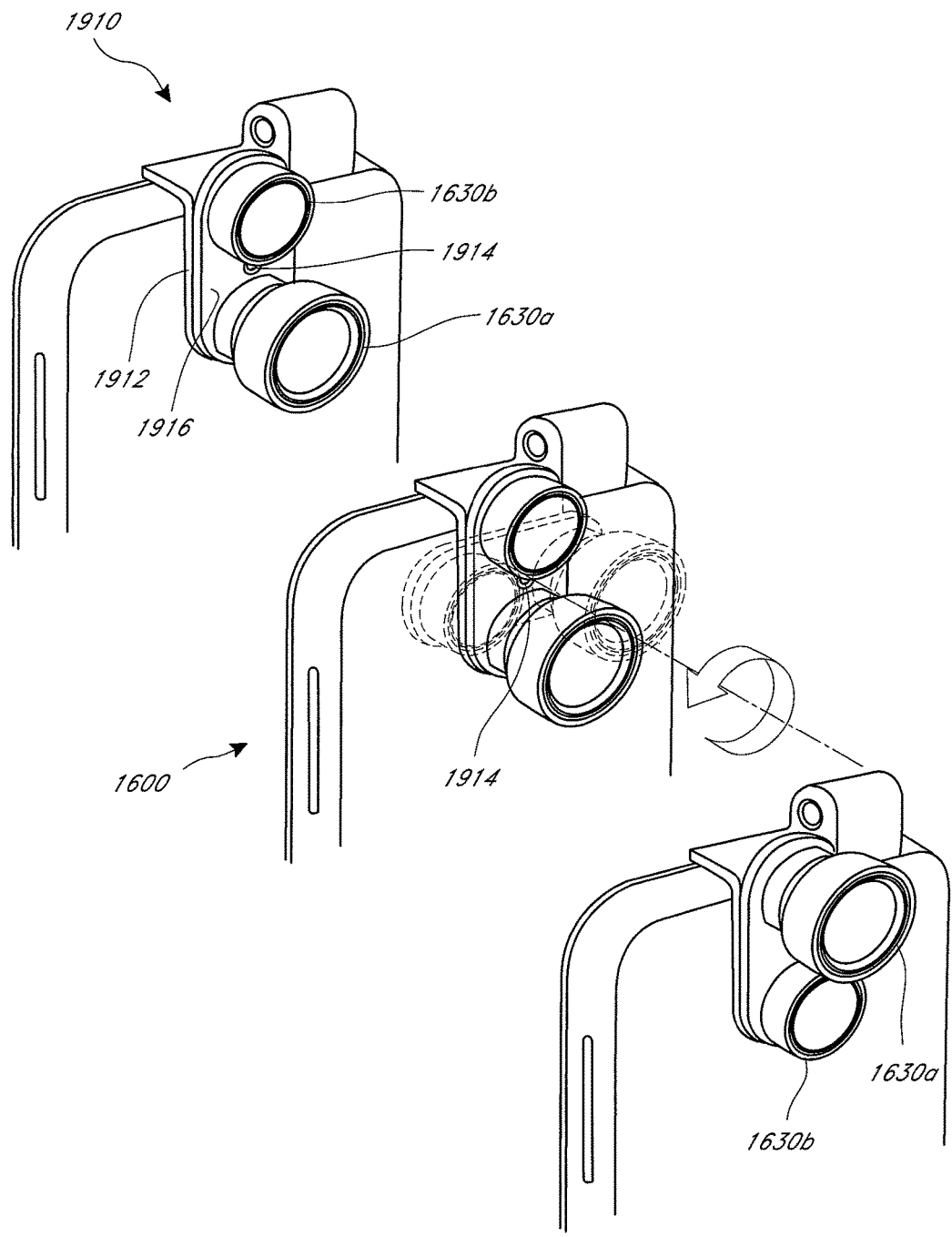

FIGS. 8A and 8B show an embodiment of a mounting component 1910 with a rotating multi-component member 1916. The rotating multi-component member 1916 may rotate through two or more positions with respect to a securement portion 1912 to which the rotating multi-component member 1916 is coupled, thereby positioning a different optical component 1630 in optical alignment with an onboard camera lens 1606 of the mobile device 1606 in each of the two or more positions. If one of the optical components 1630 is a lens configured to expand the field of view (e.g., a fisheye lens), then a second optical component may be sized proportionately smaller so as to reduce or eliminate the possibility that the second optical component is captured in an image taken with the fisheye lens. In some embodiments, rather than size the second optical component smaller than a fisheye lens, the second optical component may be positioned on the rotating multi-component member 1916 such that it will not be captured in an image taken using the fisheye lens (e.g., out of the fisheye lens's actual field of view, or within the fisheye lens's field of view but outside the area captured in an image, such as the top or bottom of an image in landscape orientation, or the left or right of an image in portrait orientation).

As shown in FIG. 8B, a particular optical component 1630a may be positioned in optical alignment with the onboard camera of the mobile device 1600 in a first position. After a user has rotated the rotating multi-component member 1916 into a second position, a different optical component 1630b may be positioned in optical alignment with the onboard camera. The rotating multi-component member 1916 may rotate about a rotating point 1914, such as a pin or a bolt that also couples to the rotating multi-component member 1916 to the securement portion 1912. As illustrated, the rotating point 1914 can be positioned substantially below an upper edge of the securement portion 1912, such as in a region that is located at generally about the vertical midpoint of the securement portion 1912.

In some embodiments, the mounting component 1910 may utilize an anchor 1920 to secure, position, and/or stabilize the mounting component 1910 with respect to the mobile device, as described above. As illustrated, the embodiment of FIGS. 8A and 8B can be used with any other features, structures, materials, or steps described elsewhere in this specification, as with all embodiments in this specification. For example, one or more optical components 1630 may be removably attached to the mounting component 1910 (e.g., to optical component receptacles thereof) using various attachment structures. As another example, the anchor 1920 may provide an electrical connection to the mobile device via a port 1608 into which the anchor 1920 is inserted.

Figure 9A:
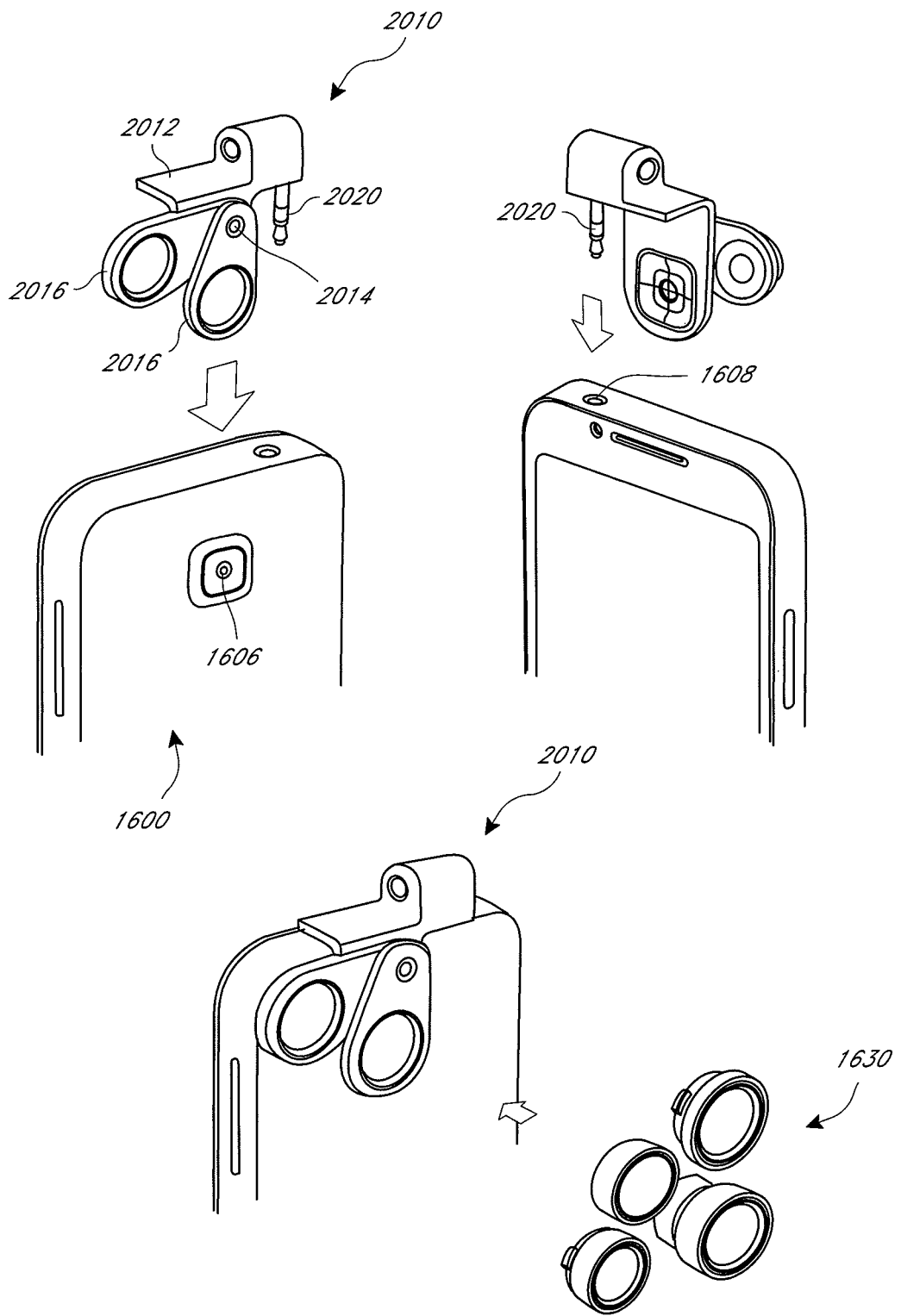
FIGS. 9A-9B illustrate another embodiment of a removable mount that permits attachment and selective use of multiple optical components.
Figure 9B:
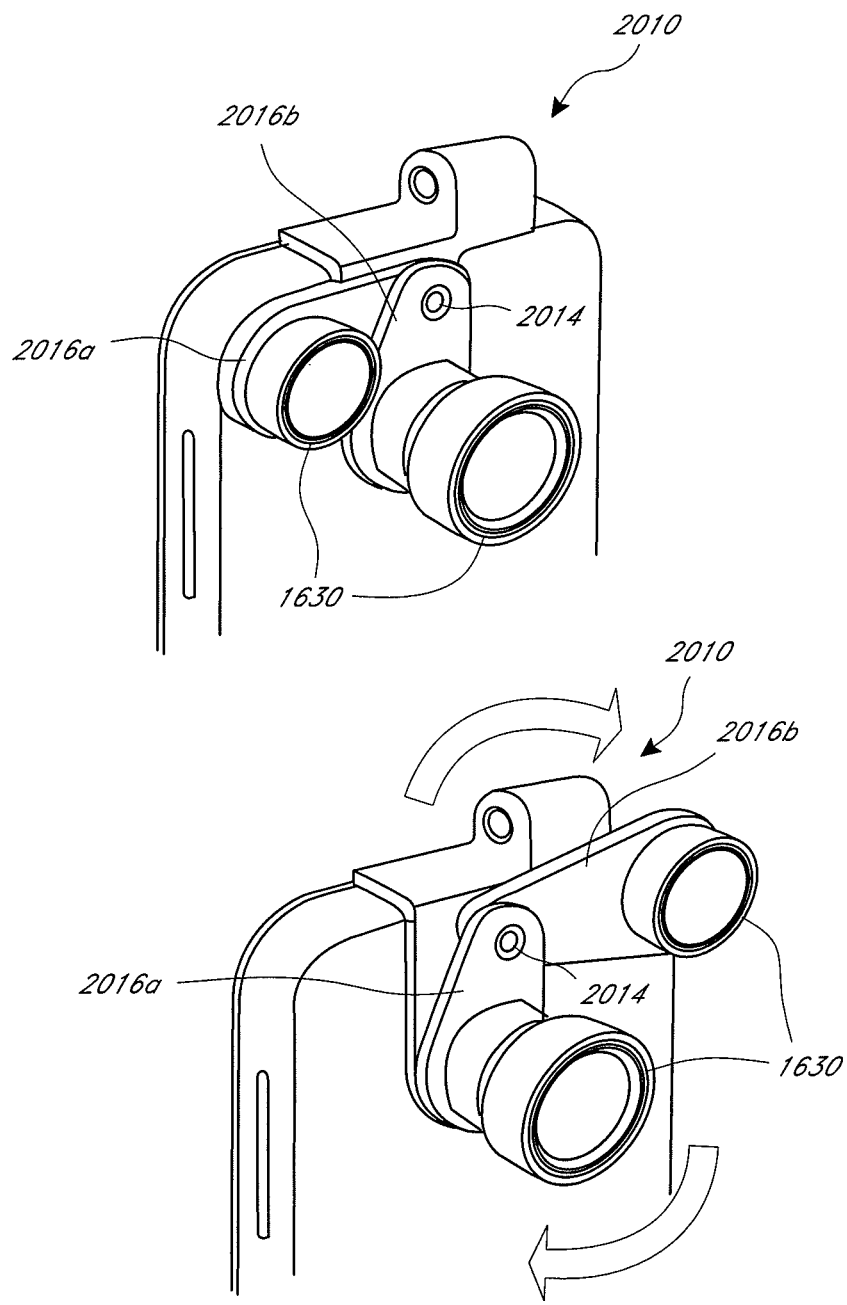

FIGS. 9A and 9B show an embodiment of a mounting component 2010 with multiple pivoting and/or rotating members 2016. In some embodiments, independently pivoting and/or rotating members 2016 may include component receptacles for removably mounting optical components 1630, or they may include permanently or semi-permanently attached optical components 1630. Each independently pivoting member 2016 may pivot about a pivot point 2014, such as a pin or bolt that couples one or more of the independently pivoting members 2016 to the mounting component 2010. As shown in FIG. 9B, a user may pivot a first independently pivoting member 2016 about the pivot point 2014 without affecting the position of a second independently pivoting member 2016b. A user may therefore adjust the positioning of the independently pivoting members 2016 to cover or uncover components or features of the mobile device 1600 (e.g., flash photography components, communication ports, etc.), achieve a comfortable or desirable configuration of components for holding the device 1600 with the mounting component 2010 attached, etc.

As illustrated, the embodiment of FIGS. 9A and 9B can be used with any other features, structures, materials, or steps described elsewhere in this specification, as with all embodiments in this specification. For example, one or more optical components 1630 may be removably attached to the mounting component 2010 (e.g., to optical component receptacles thereof) using various attachment structures. As another example, an anchor 2020 may be used to secure the mounting component 2010 to the mobile device 1600, provide an electrical connection to the mobile device via a port 1608 into which the anchor 2020 is inserted, etc.

Figure 10A:
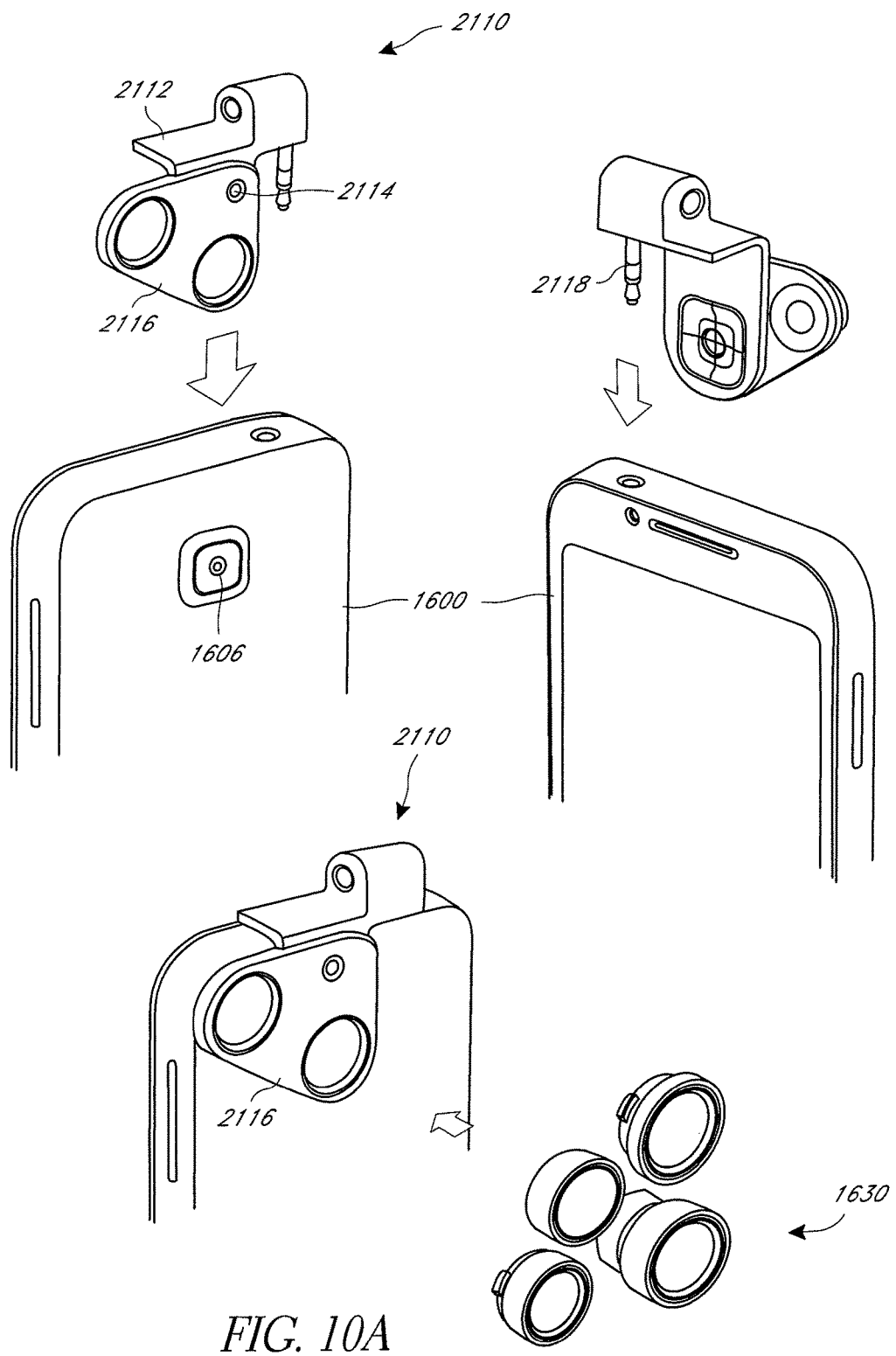
FIGS. 10A-10B illustrate another embodiment of a removable mount that permits attachment and selective use of multiple optical components.
Figure 10B:
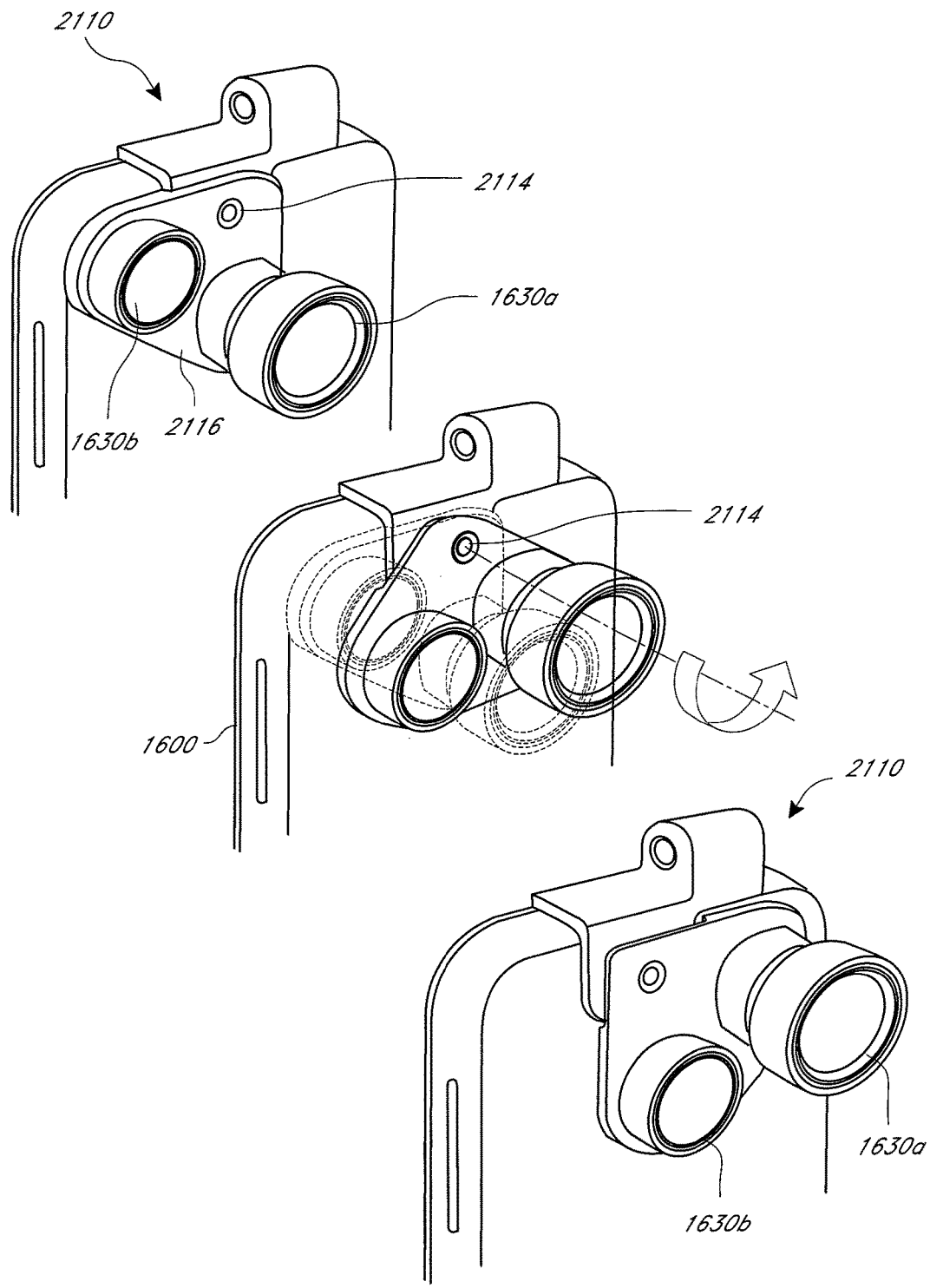

FIGS. 10A and 10B show an embodiment of a mounting component 2110 with a pivoting multi-component member 2116. The pivoting multi-component member 2116 may be coupled to the mounting component 2110 such that the pivoting multi-component member 2116 can pivot between two or more positions with respect to the mounting component 2116 and mobile device 1600. As shown in FIG. 10B, the pivoting multi-component member 2116 may pivot at a pivot point 2114, such as a pin or a bolt that also couples the pivoting multi-component member 2116 to the mounting component 2110. In a first position, a first optical component 1630a may be positioned for use with an onboard camera lens 1606 of the mobile device 1600. A user may then pivot the multi-component member 2116 about the pivot point 2114 to a second position. In the second position, a different optical component 1630b may be positioned for use with the onboard camera lens 1606.

As illustrated, the embodiment of FIGS. 10A and 10B can be used with any other features, structures, materials, or steps described elsewhere in this specification, as with all embodiments in this specification. For example, one or more optical components 1630 may be removably attached to the mounting component 2110 (e.g., to optical component receptacles thereof) using various attachment structures. As another example, an anchor 2118 may be used to secure the mounting component 2110 to the mobile device 1600, provide an electrical connection to the mobile device via a port 1608 into which the anchor 2118 is inserted, etc.

In some embodiments, the mounting component 2110 (or any other mounting component or clip of the present disclosure) may include a clip portion to secure the mounting component to a mobile device. For example, the clip portion may utilize any of the features or methods described herein, described in U.S. Pat. No. 8,279,544, or known to those of skill in the art to secure, position, and stabilize the mounting component with respect to the mobile device. A pivoting, rotating, sliding, or otherwise movable multi-component member may be coupled to the clip portion, and may move relative to the clip portion as described above with respect to various mounting components, such as those illustrated in FIGS. 9-10.

Figure 11B:
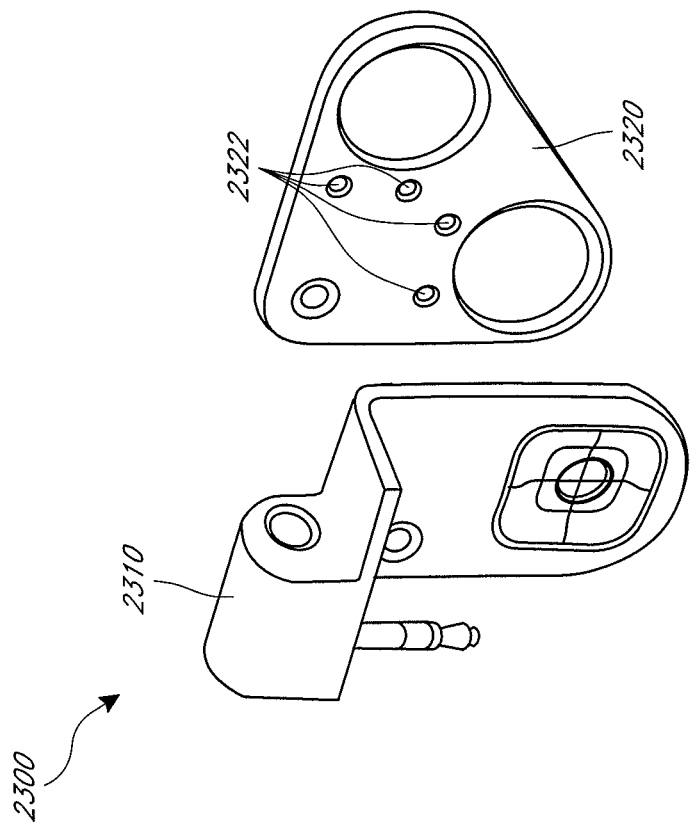
FIGS. 11A-11B illustrate another embodiment of a removable mount that permits attachment and selective use of multiple optical components.
Figure 11A:
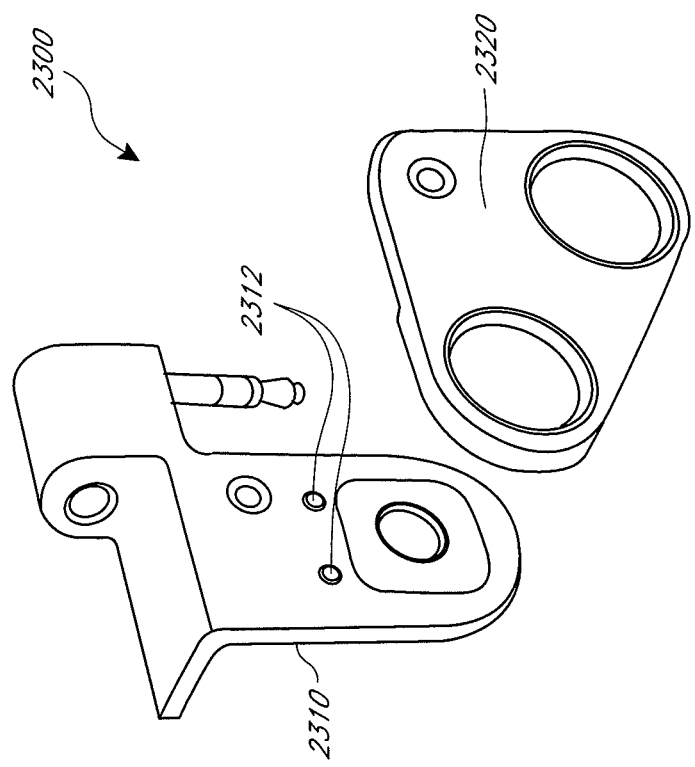

FIGS. 11A and 11B show an embodiment of a mounting component 2300 with a pivoting multi-component member 2320. Similar to other pivoting members described herein, the pivoting multi-component member 2320 shown in FIGS. 11A and 11B may pivot about a pivot point, such as a pin or a bolt, which couples the multi-component member 2320 to a securement portion 2310 of the mounting component 2300. The securement portion 2310 may be configured with one or more alignment structures 2312, such as detents, spring-loaded ball bearings, or the like, to stop and/or resist the pivoting motion of the multi-component member 2320 at specific positions (e.g., a first position for using a first optical component with an onboard camera lens of the mobile device, and a second position for using a second optical component). For example, the securement portion 2310 may include one or more protruding alignment structures 2312, such as bumps, protrusions, or ball detents. The multi-component member 2320 may include one or more complementary alignment structures 2322 which correspond to the alignment structures 2312 of the securement portion 2310. For example, the multi-component member 2320 may include recessed alignment structures 2322, such as holes, indentations, or grooves, that receive a protruding alignment structure 2312 and temporarily stop or resist further pivoting of the multi-component member 2320. The alignment structures 2312, 2322 may be located on the securement portion 2310 and multi-component member 2320, respectively, such that they temporarily stop or resist further pivoting of the multi-component member 2320 at any one of multiple positions. Each of the positions may correspond to a location at which a particular optical component is positioned for use with an onboard camera lens of the mobile device. In some embodiments, the securement portion 2310 may include recessed alignment structures and the multi-component member 2320 may include protruding alignment structures. In some embodiments, the multi-component member 2320 and securement portion 2310 may each include a combination of protruding and recessed alignment structures.

Figure 12A:
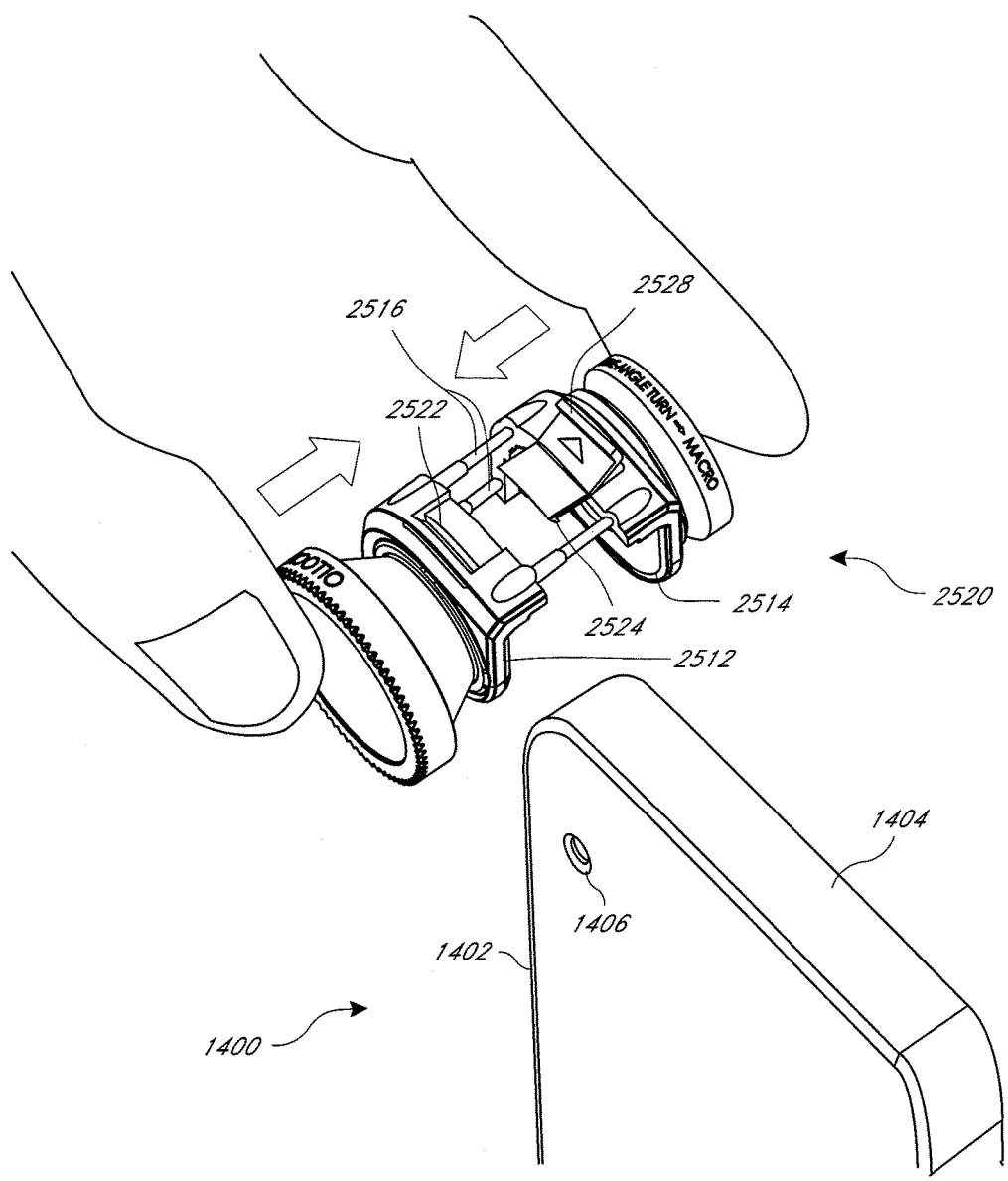
FIGS. 12A-12B illustrate an embodiment of a removable optical device configured to attach to mobile devices through the use of clamping mechanisms.
Figure 12B:
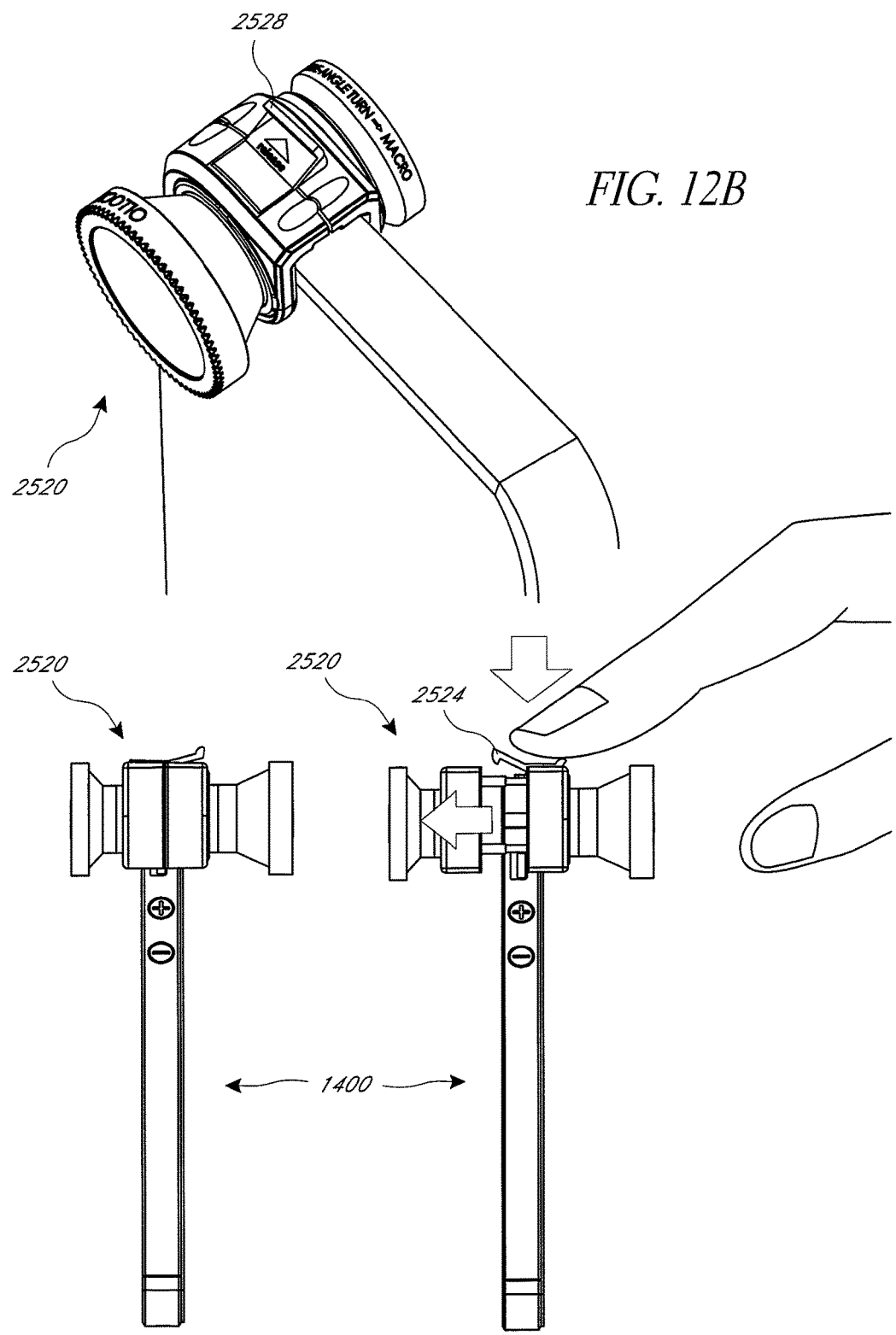

FIGS. 12A and 12B illustrate embodiments of an auxiliary optical device that may be secured to a mobile device by clamping or otherwise contracting or squeezing upon a portion of the mobile device. For example, an auxiliary optical device 2520 may be clamped to a mobile device 1400 by squeezing two or more portions 2512, 2514 of the auxiliary optical device 2520 together. The distance between a face of the first portion 2512 and a face of the second portion 2514 can be increased or decreased to attach or remove the optical device 2520 to or from the mobile electronic device 1400. A portion of the mobile device 1400 (e.g., a corner where first and second generally orthogonal sides 1402 and 1404 generally converge near an onboard camera lens 1406) may be positioned between the first portion 2512 and second portion 2514 of the auxiliary optical device 2520. A user may exert pressure or otherwise urge the first portion 2512 towards the second portion 2514. A latch may secure the first and second portions such that the auxiliary lens component is clamped to the mobile device. Once the auxiliary optical device 2520 is attached to the mobile device 1400, an optical component coupled to the first or second portion 2512 or 2514 may be automatically oriented in optical alignment with an onboard camera lens 1406 of the mobile device such that no manual alignment or adjustment is necessary. For example, the auxiliary optical device 2520 may automatically register against first and second generally orthogonal, generally converging edges 1402, 1404 of the mobile device 1400, as described in U.S. Pat. No. 8,279,544. In some embodiments, a second optical component may be coupled to the other of the first or second portions 2512 or 2514, and a user may remove, rotate, and re-attach the auxiliary optical device 2520 to the mobile device 1400 such that the second optical component is automatically oriented in optical alignment with the onboard camera lens 1406.

In some embodiments, as shown, the auxiliary optical device 2520 may include a plurality of expanding and contracting members 2516. The members 2516 may secure the first portion 2512 of the auxiliary optical device 2520 to the second portion 2514. Although three (3) such members 2516 are shown in FIG. 12A, some implementations may use additional or fewer members 2516. The members 2516 may be telescoping members such that they can expand and contract in sections. When a portion of a mobile device 1400 (e.g., a corner) is positioned between the first and second portions 2512, 2514, the first and second portions 2512, 2514 may be squeezed together, and the members 2516 may retract or contract accordingly. A lock and release button 2528 with a latch 2524 can be coupled to either the first or the second portion 2512 or 2514, and the latch 2524 can engage a catch 2522 on the opposite portion (e.g., not the portion to which the lock and release button 2528 is coupled). When the lock and release button 2528 is activated, the latch 2524 may release the catch 2522, and the first and second portions 2512 and 2514 may be manually or automatically expanded away from each other.

Figure 13A:
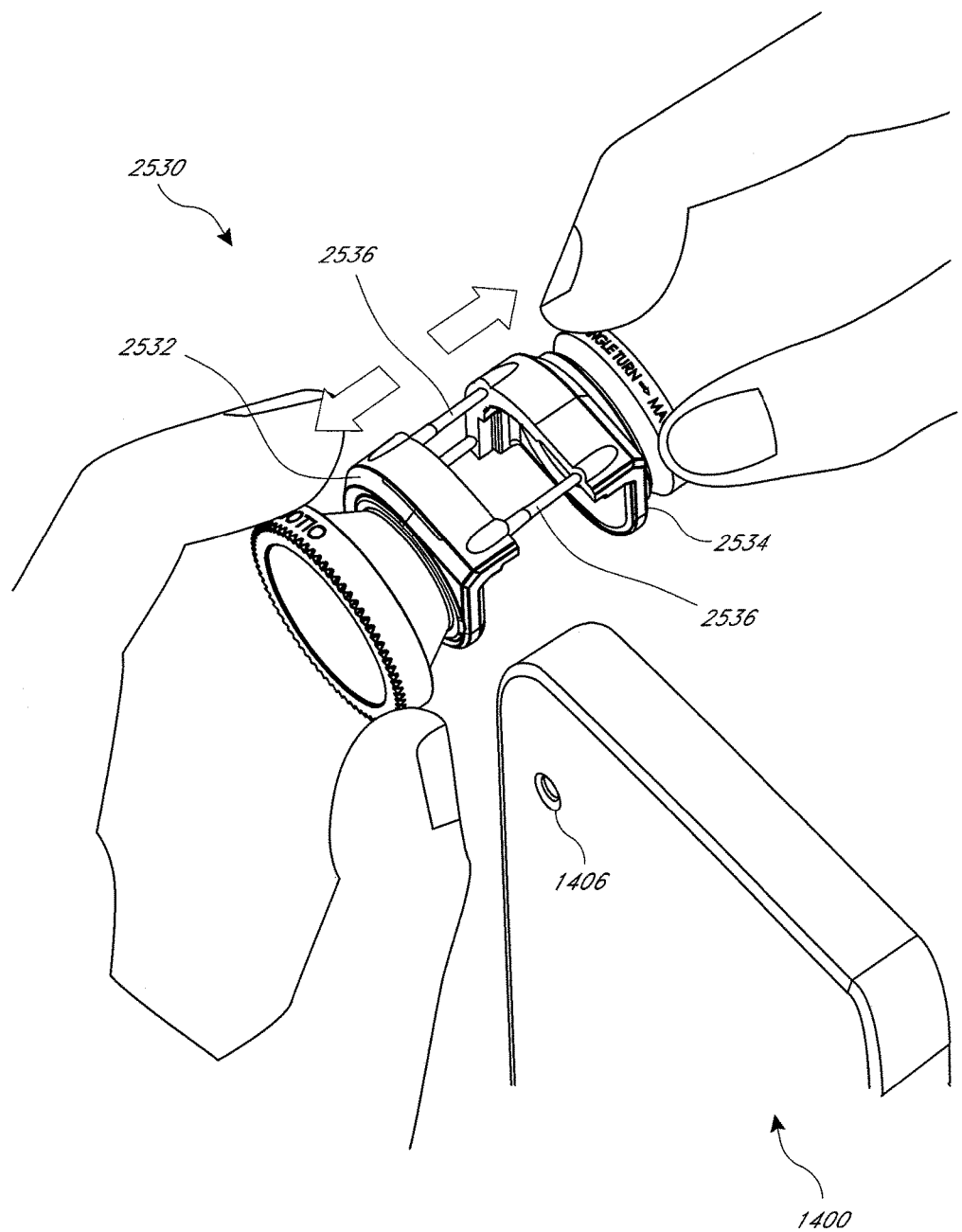
FIGS. 13A-13B illustrate another embodiment of a removable optical device configured to attach to mobile devices through the use of clamping mechanisms.
Figure 13B:
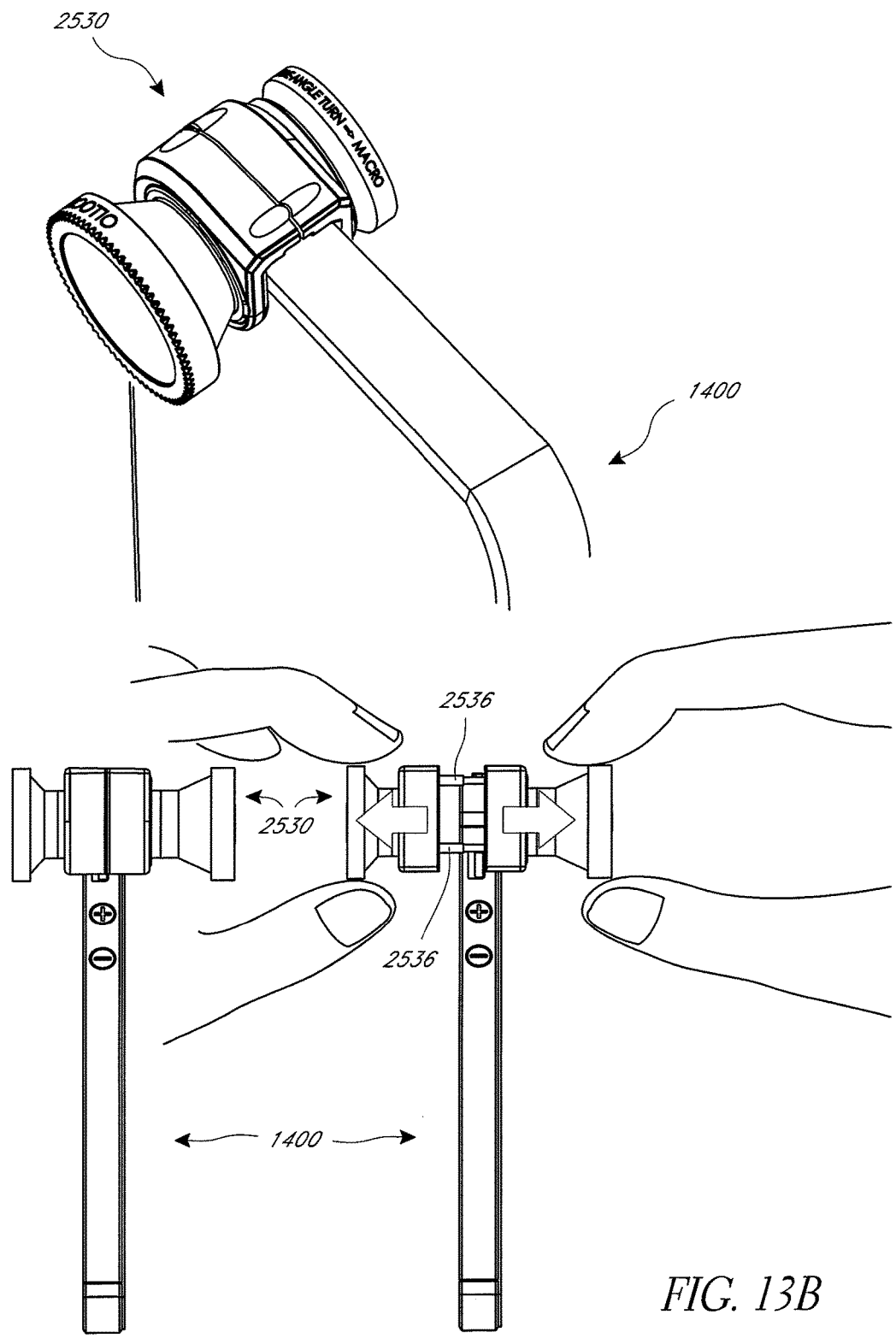

FIGS. 13A and 13B illustrate an auxiliary optical device 2530 that may be spring-loaded or otherwise biased to a clamping position. The auxiliary optical device 2530 can include a first portion 2532 coupled to a second portion 2534 by members 2536, similar to the auxiliary optical device 2520 described above. The expanding and contracting members 2536 may be spring loaded or biased such that they urge the first and second portions 2532, 2534 toward each other. As a result, a user may manually expand the first portion 2532 away from the second portion 2534 to attach the auxiliary optical device 2530 to a mobile device 1400. The user may then release one or both of the portions 2532, 2534, and the bias of the members 2536 can clamp the auxiliary optical device 2530 to the mobile device 1400 without a latch or other mechanism. A user may perform a similar operation to unclamp the auxiliary optical device 2530 from the mobile device. For example, the user may expand a first portion 2532 away from a second portion 2534 to remove the clamped auxiliary optical device 2530 from the mobile device 1400.

Once the auxiliary optical device 2530 is attached to the mobile device 1400, an optical component coupled to the first or second portion 2532 or 2534 may be automatically oriented in optical alignment with an onboard camera lens 1406 of the mobile device such that no manual alignment or adjustment is necessary. For example, the auxiliary optical device 2530 may automatically register against first and second generally orthogonal, generally converging edges 1402, 1404 of the mobile device 1400, as described in U.S. Pat. No. 8,279,544. In some embodiments, a second optical component may be coupled to the other of the first or second portions 2532 or 2534, and a user may remove, rotate, and re-attach the auxiliary optical device 2530 to the mobile device 1400 such that the second optical component is automatically oriented in optical alignment with the onboard camera lens 1406.

Figure 14A:
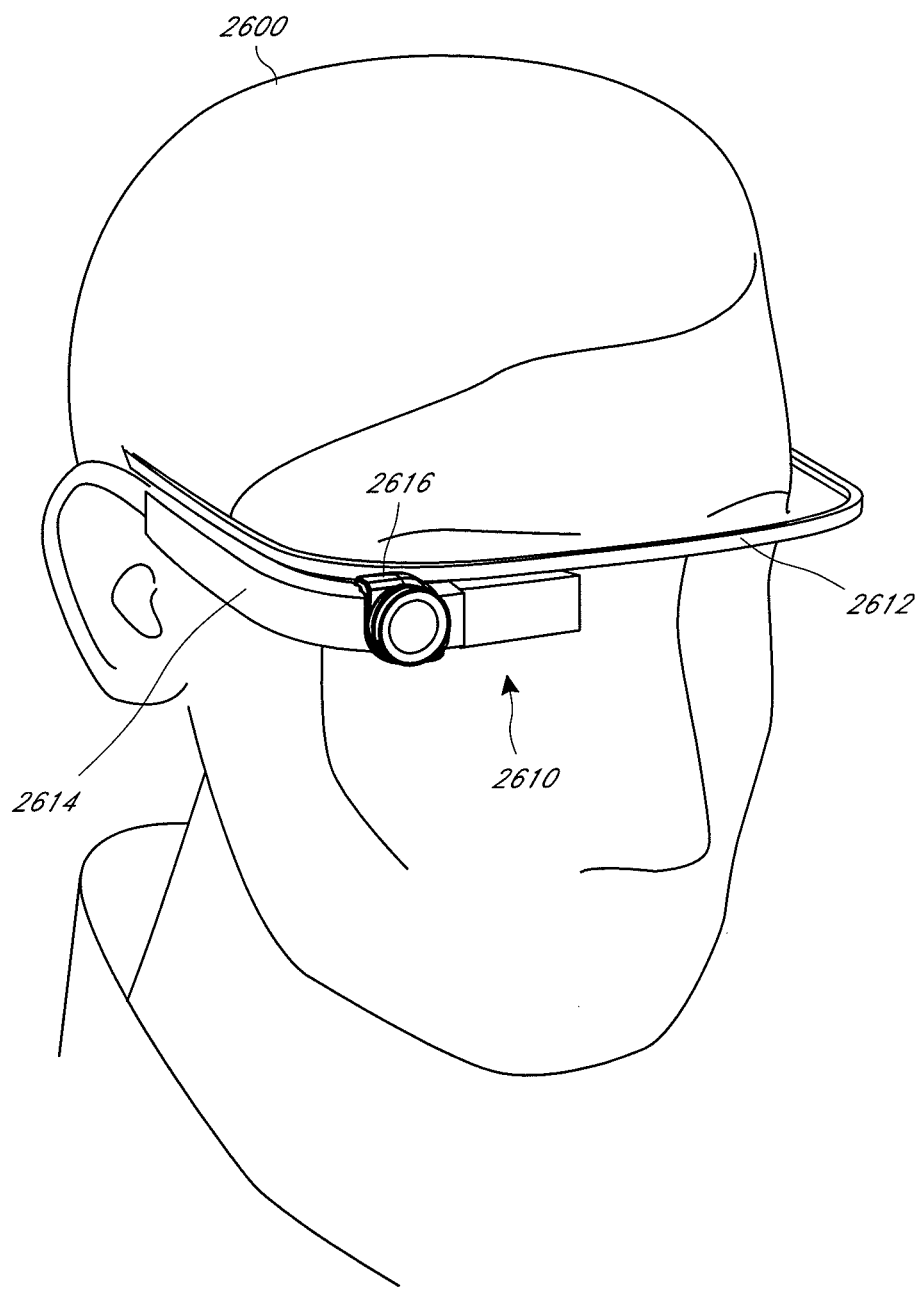
FIGS. 14A-14C illustrate an embodiment of a removable optical device configured for use with wearable accessories.
Figure 14B:
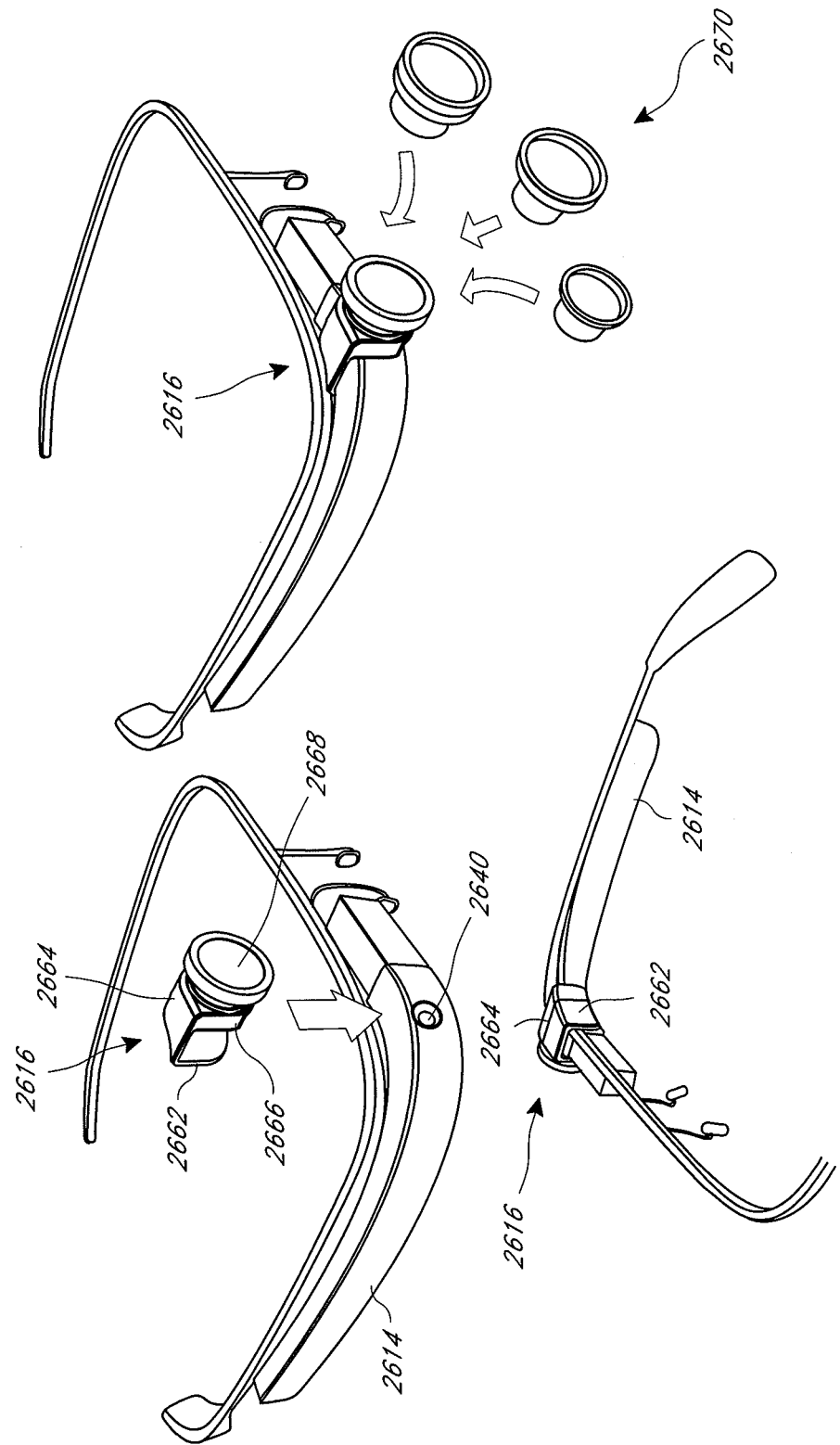
Figure 14C:
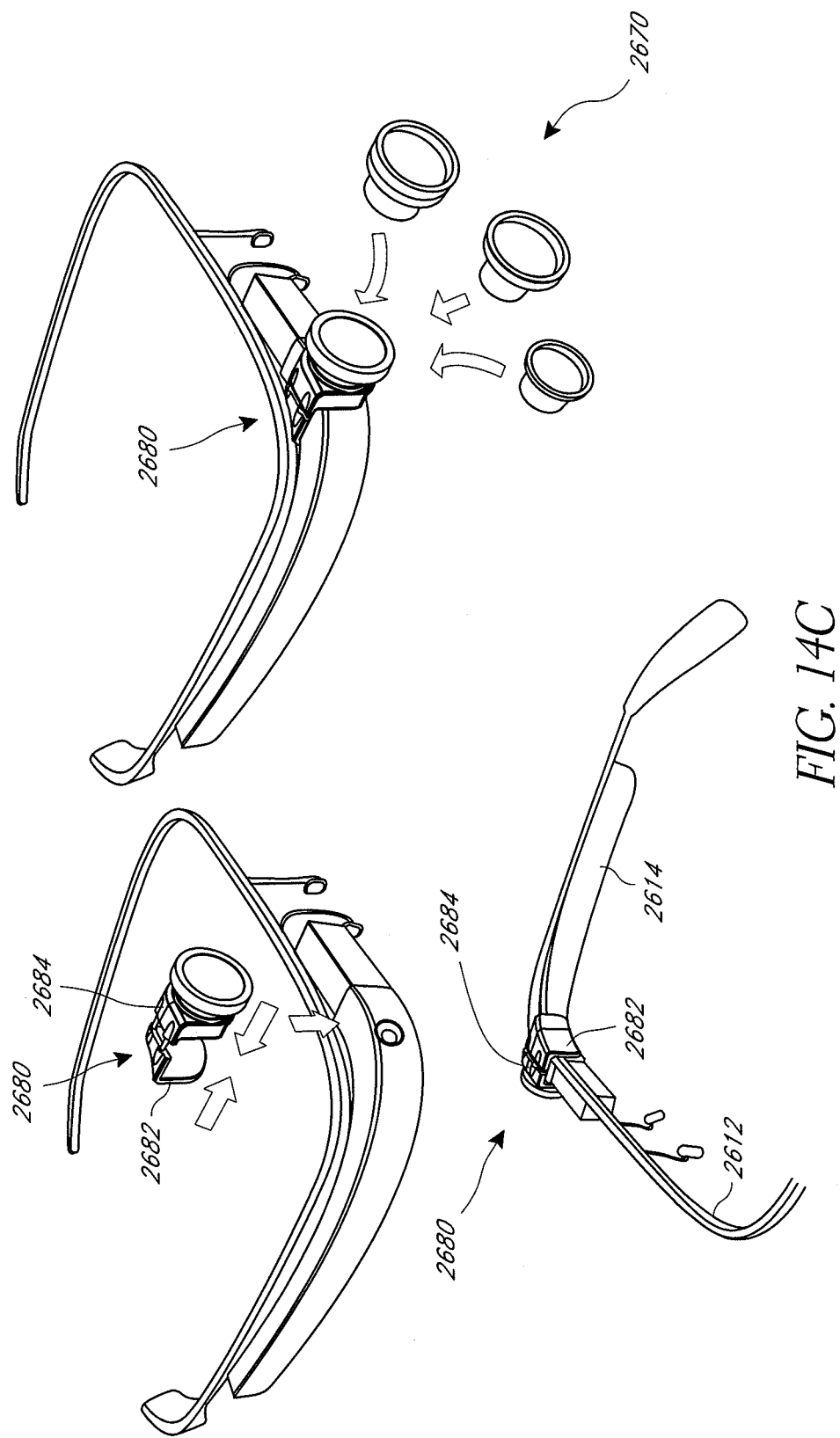

FIGS. 14A-14C and 15A-15B illustrate embodiments of auxiliary optical devices for use with other accessories, such as headwear or eyewear (such as a heads-up display) with onboard camera lenses. The example of an eyewear accessory 2610 shown in FIGS. 14A-14C is a Google Glass from Google, although the auxiliary lens components described herein may be used with other headwear, eyewear, or wearable accessories. A user 2600 may use the onboard camera lens of the eyewear 2610 to capture images and video from the user's point of view.

The eyewear 2610 may include a housing 2614 coupled to a frame 2612. As shown in FIG. 14B, the housing 2614 may include an onboard camera lens 2640. An auxiliary optical device 2616 may be removably attached to the eyewear 2610 in order to enhance or alter light that passes to the onboard camera lens 2640, as described above. The auxiliary optical device 2616 may include a permanently or semi-permanently attached optical component 2668, such as a lens or a filter. In some embodiments, the auxiliary optical device 2616 may provide a lens receptacle to which various removable optical components 2670 may be attached, as described above.

The auxiliary optical device 2616 may include a clip portion 2664 to which an optical component 2668 or 2670 may be attached. The clip portion 2664 may include a first sidewall 2662 and a second sidewall 2666. The first and second sidewalls 2662, 2666 may form a channel into which a portion of the housing 2614 may be inserted. The sidewalls 2662, 2666 may be generally parallel, or they may be shaped and/or sized to be generally complementary to the shape and/or size of the housing 2614 to which the clip portion 2664 will be attached. The auxiliary optical device 2616 may be attached to the eyewear 2610 such that the lens component 2668 is adjacent or generally co-axial with the onboard camera lens 2640. The configuration of the channel may aid in proper positioning of the auxiliary optical device 2616 to achieve alignment of the optical component 2668 and the onboard camera lens 2640. For example, the contour of the housing 2614 may vary, such that the area of the housing 2614 near the onboard camera lens 2640 is unique or different than other areas of the housing 2614 farther from the onboard camera lens 2640. The interior contour of the channel formed by the first and second sidewalls 2662, 2666 may be complementary to the contour of the housing 2614 near the onboard camera lens 2640. Any of the steps, features, or structures disclosed in this specification relating to any other embodiment can be used instead of or in addition to those described and/or shown in the embodiment of FIGS. 14A-14C.

In some embodiments, at least a portion or all of the channel may be resilient, rubbery, tacky, or otherwise provide increased friction to aid in securing the clip portion 2664 to the housing 2614. In some embodiments, the exterior shape or surface of the second sidewall 2662 (e.g., the side that faces the user 2600) may be contoured so as to provide a comfortable fit for a user 2600 when the user 2600 uses the auxiliary optical device 2616 with the eyewear 2610.

In some embodiments, as shown in FIG. 14C, an auxiliary optical device 2680 may be configured to clamp onto the housing 2614 or some other portion of the eyewear 2610. For example, the auxiliary optical device 2680 may include a first portion 2682 and a second portion 2684 that are movable relative to each other. The first and second portions 2682, 2684 may clamp onto the eyewear 2610 as described above with respect to FIGS. 12A-12B and 13A-13B.

Figure 15A:
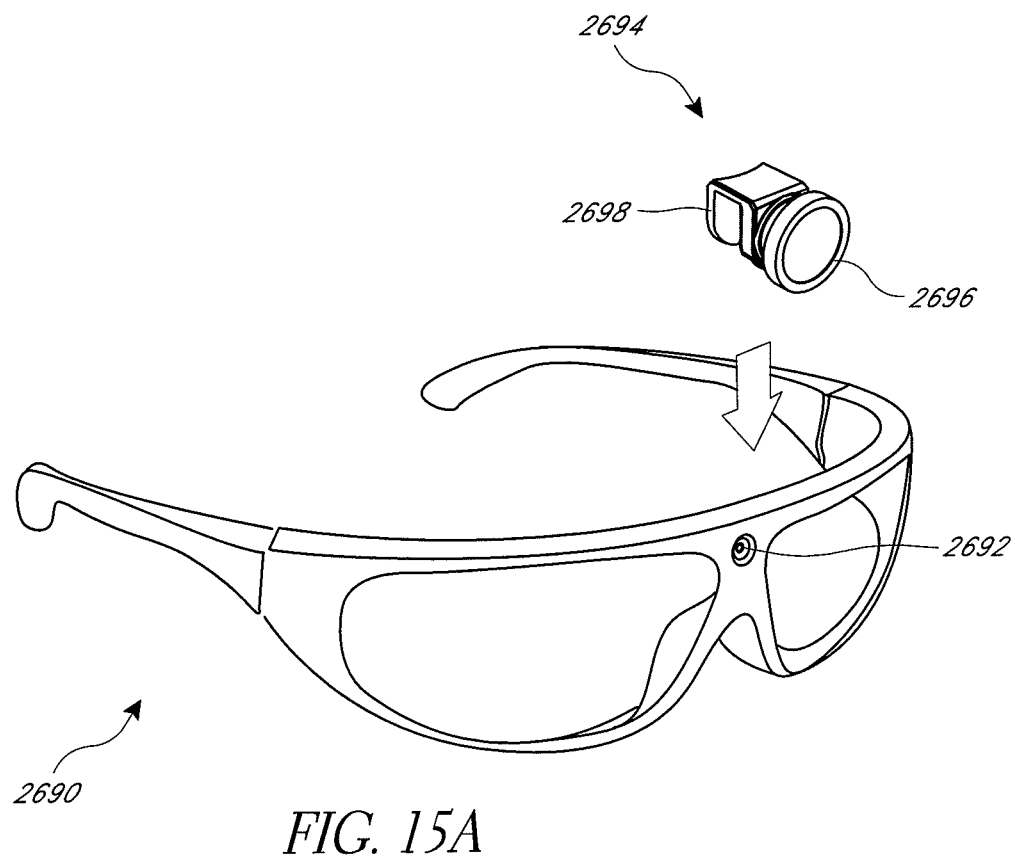
FIGS. 15A-15B illustrate another embodiment of a removable optical device configured for use with wearable accessories.
Figure 15B:
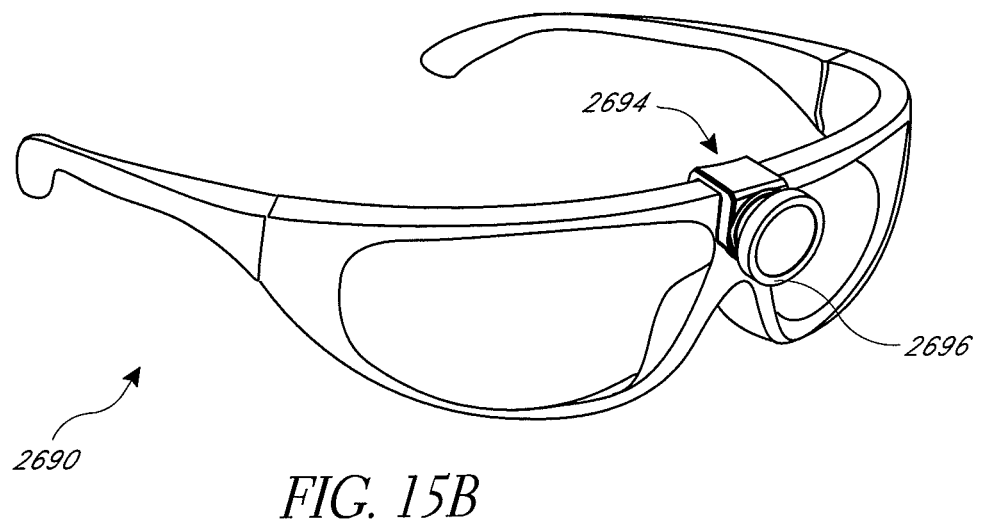

FIGS. 15A and 15B show an embodiment of an auxiliary optical device 2694 that can be used with a different wearable accessory 2690. The eyewear accessory 2690 shown in FIGS. 15A and 15B includes a centrally-located onboard camera lens 2692. The auxiliary optical device 2694 includes a clip portion 2698 and an optical component 2696. As described above, the clip portion 2698 may form a channel into which a portion of the eyewear 2690 may be inserted. The channel may be configured to aid or ensure alignment of the optical component 2696 with the onboard camera lens 2692 when the auxiliary optical device 2694 is attached to the eyewear 2690.

In any embodiment illustrated and/or disclosed in this specification, a plurality of auxiliary lenses can be retained by a retainer such that, when the retainer is removably attached to a mobile electronic device, at least one of the lenses is configured to be in optical alignment or optical communication with a first onboard camera located on a first side of the mobile electronic device, and at least one of the lenses is configured to be in optical alignment or optical communication with a second onboard camera located on a second side of the mobile electronic device that is generally opposite from the first side of the mobile electronic device, at the same time. In some embodiments, the retainer can be configured to be switchable by removing and rotating and reattaching the retainer to the mobile electronic device, such that the auxiliary lens that is initially located in optical alignment or communication with the first onboard camera can be positioned in optical alignment or communication with the second onboard camera, and the auxiliary lens that is initially located in optical alignment or communication with the second onboard camera can be positioned in optical alignment or communication with the first onboard camera. In some embodiments, the simultaneous optical communication with the plurality of auxiliary lenses and each of the plurality of onboard cameras or onboard camera lenses can provide optical enhancements for photographing in multiple directions, including optical enhancement for "selfie" photographs and for other photographs facing away from the user. As with all embodiments disclosed and/or illustrated herein, any of the auxiliary lenses can be interchangeable with a selection of different auxiliary lenses having different optical qualities, such as any of those described elsewhere in this specification.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention.

The following is claimed:

1. An auxiliary optical device configured to be removably attachable to a mobile electronic deivce, the auxiliary optical device comprising:
   a mounting component configured to be removably attachable to a mobile electronic device, the mounting component comprising:
      an optical mounting region configured to be positioned near an onboard camera lens of the mobile electronic device; and
      an anchoring component configured to be inserted into an electronic port of the mobile electronic device, the anchoring component being configured to aid in securing the mounting component to the mobile electronic device without providing electrical communication outside of the electronic mobile device; and
   an optical component coupled to the optical mounting region of the mounting component, wherein the optical component is in optical alignment with the onboard camera lens of the mobile electronic device.

2. The combination of the auxiliary optical device of claim 1 and the mobile electronic device.

3. The auxiliary optical system of claim 1, wherein the anchoring component is configured to resist sliding of the mounting component on the mobile electronic device when inserted into the electronic port.

4. The auxiliary optical system of claim 1, wherein the anchoring component provides electronic communication with the mobile electronic device via the electronic port.

5. The auxiliary optical system of claim 4, wherein the mounting component further comprises an electronic port configured to provide electronic communication with the mobile electronic device via the anchoring component.

6. The auxiliary optical system of claim 1, further comprising a second optical component coupled to a second optical mounting region, wherein the second optical mounting region may be oriented by a user such that the second optical component is in optical alignment with the onboard camera lens.

7. The auxiliary optical system of claim 6, wherein the mounting component comprises a detent configured to aid alignment of the second optical component.

8. The auxiliary optical system of claim 6, wherein the optical mounting region and second optical mounting region are movable independently of each other.

9. The auxiliary optical system of claim 6, wherein the optical mounting region and second optical mounting region are integrated on a single component.

10. The auxiliary optical system of claim 1, wherein the optical component comprises a magnifying lens.

11. The auxiliary optical system of claim 1, wherein the optical component comprises a wide-angle lens.

12. The auxiliary optical system of claim 1, wherein the optical component comprises a polarizing lens.

13. The auxiliary optical system of claim 1, wherein the optical component can be removably attached to the optical mounting region.

* * * * *